(12) United States Patent
Moon et al.

(10) Patent No.: US 10,779,172 B2
(45) Date of Patent: Sep. 15, 2020

(54) METHOD AND DEVICE FOR COMMUNICATION USING UNLICENSED BAND IN MOBILE COMMUNICATION SYSTEM

(71) Applicant: Samsung Electronics Co., Ltd., Suwon-si, Gyeonggi-do (KR)

(72) Inventors: Jungmin Moon, Suwon-si (KR); Sunheui Ryoo, Yongin-si (KR); Rayeon Ahn, Seoul (KR); Sungjin Lee, Bucheon-si (KR); Jungsoo Jung, Seongnam-si (KR); Seunghoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 15/522,178

(22) PCT Filed: Nov. 2, 2015

(86) PCT No.: PCT/KR2015/011633
§ 371 (c)(1),
(2) Date: Apr. 26, 2017

(87) PCT Pub. No.: WO2016/068668
PCT Pub. Date: May 6, 2016

(65) Prior Publication Data
US 2017/0339588 A1 Nov. 23, 2017

Related U.S. Application Data

(60) Provisional application No. 62/073,379, filed on Oct. 31, 2014.

(51) Int. Cl.
*H04W 24/08* (2009.01)
*H04W 88/02* (2009.01)
(Continued)

(52) U.S. Cl.
CPC .............. *H04W 24/08* (2013.01); *H04L 5/14* (2013.01); *H04W 72/042* (2013.01);
(Continued)

(58) Field of Classification Search
CPC ............. H04W 24/08; H04W 72/0446; H04W 72/042; H04W 76/046
See application file for complete search history.

(56) References Cited

U.S. PATENT DOCUMENTS

2005/0036573 A1* 2/2005 Zhang .................... H04B 1/707
375/343
2005/0052995 A1* 3/2005 Gu .......................... H04L 47/11
370/230
(Continued)

FOREIGN PATENT DOCUMENTS

CN   101163076 A    4/2008
CN   101558615 A   10/2009
(Continued)

OTHER PUBLICATIONS

LG Electronics: "Candidate solutions for LAA operation", 3GPP Draft; R1-144042 LAA Candidate Solutions_Final, 3rd Generation Partnership Project (3GPP), Mobile Competence Centre ; 650, Route Des Lucioles ; F-06921 Sophia-Antipolis Cedex ; France, vol. RAN WG1, No. Ljubljana, Slovenia; Oct. 5, 2014, XP050875341.
(Continued)

*Primary Examiner* — Jamal Javaid
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present invention relates to a method by a base station in a mobile communication system, the method comprising the
(Continued)

steps of: checking a channel state in an unlicensed band; determining a parameter for checking whether a channel is occupied, according to the channel state; and transmitting the determined parameter to a terminal.

16 Claims, 19 Drawing Sheets

(51) Int. Cl.
| | | |
|---|---|---|
| *H04W 88/08* | (2009.01) | |
| *H04W 74/08* | (2009.01) | |
| *H04W 76/27* | (2018.01) | |
| *H04L 5/14* | (2006.01) | |
| *H04W 72/04* | (2009.01) | |
| *H04W 72/08* | (2009.01) | |
| *H04W 16/14* | (2009.01) | |

(52) U.S. Cl.
CPC ... *H04W 72/0446* (2013.01); *H04W 74/0808* (2013.01); *H04W 76/27* (2018.02); *H04W 88/02* (2013.01); *H04W 88/08* (2013.01); *H04W 16/14* (2013.01); *H04W 72/085* (2013.01)

(56) References Cited

U.S. PATENT DOCUMENTS

| | | |
|---|---|---|
| 2008/0146156 A1 | 6/2008 | Makhlouf et al. |
| 2009/0238163 A1 | 9/2009 | Zhang et al. |
| 2009/0323835 A1 | 12/2009 | Rao et al. |
| 2011/0116458 A1 | 5/2011 | Hsu et al. |
| 2012/0304213 A1 | 11/2012 | Lee et al. |
| 2013/0017794 A1 | 1/2013 | Kloper et al. |
| 2013/0336302 A1 | 12/2013 | Lee et al. |
| 2014/0031054 A1* | 1/2014 | Zou .................. H04W 16/14 455/452.2 |
| 2014/0071919 A1 | 3/2014 | Kitazoe et al. |
| 2014/0198642 A1 | 7/2014 | Barriac et al. |

FOREIGN PATENT DOCUMENTS

| | | |
|---|---|---|
| KR | 10-2011-0025778 A | 3/2011 |
| KR | 10-2012-0120135 A | 11/2012 |
| KR | 10-2014-0010385 A | 1/2014 |
| KR | 10-2014-0105357 A | 9/2014 |
| WO | 2012-057584 A2 | 5/2012 |

OTHER PUBLICATIONS

Chinese Office Action dated Aug. 27, 2019, issued in the Chinese Application No. 201580058312.0.

* cited by examiner

FIG. 1

| TDD | DL/UL switch periodicity | 0 | 1 | 2 | 3 | 4 | 5 | 6 | 7 | 8 | 9 |
|---|---|---|---|---|---|---|---|---|---|---|---|
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 5ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

METHOD AND DEVICE FOR COMMUNICATION USING UNLICENSED BAND IN MOBILE COMMUNICATION SYSTEM

TECHNICAL FIELD

The present invention relates to a mobile communication system and, in particular, to a communication method and apparatus operating in an unlicensed band in the mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Mobile communication systems were developed to provide subscribers with voice communication services on the move. Recently, mobile communication systems have evolved to the level of supporting high speed data communication services beyond the early voice-oriented services. However, the resource shortage and user requirements for higher speed services are spurring evolution towards increasingly more advanced mobile communication systems.

As one of the next-generation mobile communication systems to meet such requirements, standardization for a Long-Term Evolution (LTE) system is underway in the $3^{rd}$ Generation Partnership Project (3GPP). LTE is a technology designed to provide high speed packet-based communication of up to 100 Mbps and aims at commercial deployment around 2010. In order to accomplish this aim, discussions are being held on several schemes: one scheme for reducing the number of nodes located in a communication path by simplifying a configuration of the network, and another scheme for maximally approximating wireless protocols to wireless channels.

Recently, a technique called Licensed Assisted Access (LAA) has been proposed to improve frequency utilization efficiency by using Carrier Aggregation (CA) across licensed and unlicensed bands.

As in LTE systems, Time Division Duplexing (TDD) is used in an LLA system. There is therefore a need of a method for determining a TDD frame structure and TDD configuration information for use in the LAA system.

DISCLOSURE OF INVENTION

Technical Problem

The present invention has been conceived to solve the above problems. The present invention proposes a method for determining a TDD frame structure and TDD configuration information for use in an LAA system. Also, the present invention proposes a method for determining parameters for checking unlicensed band channel occupancy based on channel condition.

Solution to Problem

In accordance with an aspect of the present invention, a communication method of a base station in a mobile communication system includes checking a state of a channel in an unlicensed band, determining parameters for checking channel occupancy according to the channel state, and transmitting the parameters to a terminal.

In accordance with another aspect of the present invention, a communication method of a base station in a mobile communication system includes determining configuration information on subframes including downlink subframes consecutive within a predetermined time period in an unlicensed band and transmitting the configuration information to a terminal.

In accordance with another aspect of the present invention, a base station of a mobile communication system includes a transceiver which communicates with a network entity and a controller which checks a state of a channel in an unlicensed band, determines parameters for checking channel occupancy according to the channel state, and controls the transceiver to transmit the parameters to a terminal.

In accordance with another aspect of the present invention, a base station of a mobile communication system includes a transceiver which communicates with a network entity and a controller which determines configuration information on subframes including downlink subframes consecutive within a predetermined time period in an unlicensed band and controls the transceiver to transmit the configuration information to a terminal.

In accordance with another aspect of the present invention, a communication method of a terminal of a mobile communication system includes checking a channel state in an unlicensed band, transmitting information on the channel state to a base station, and receiving parameters for checking channel occupancy determined based on the channel state.

In accordance with still another aspect of the present invention, a terminal of a mobile communication system includes a transceiver which communicates with a network entity and a controller which checks a channel state in an unlicensed band and controls the transceiver to transmit information on the channel state to a base station and receive parameters for checking channel occupancy determined based on the channel state.

Advantageous Effects of Invention

The present invention is advantageous in terms of facilitating TDD operations in an unlicensed band using a TDD frame structure proposed for use in an LAA system. Also, the present invention is advantageous in terms of increasing data processing throughput by determining CCA parameters depending on channel condition.

BRIEF DESCRIPTION OF DRAWINGS

FIG. 1 is a diagram illustrating the TDD configurations specified in LTE;

MODE FOR THE INVENTION

Figure 2:
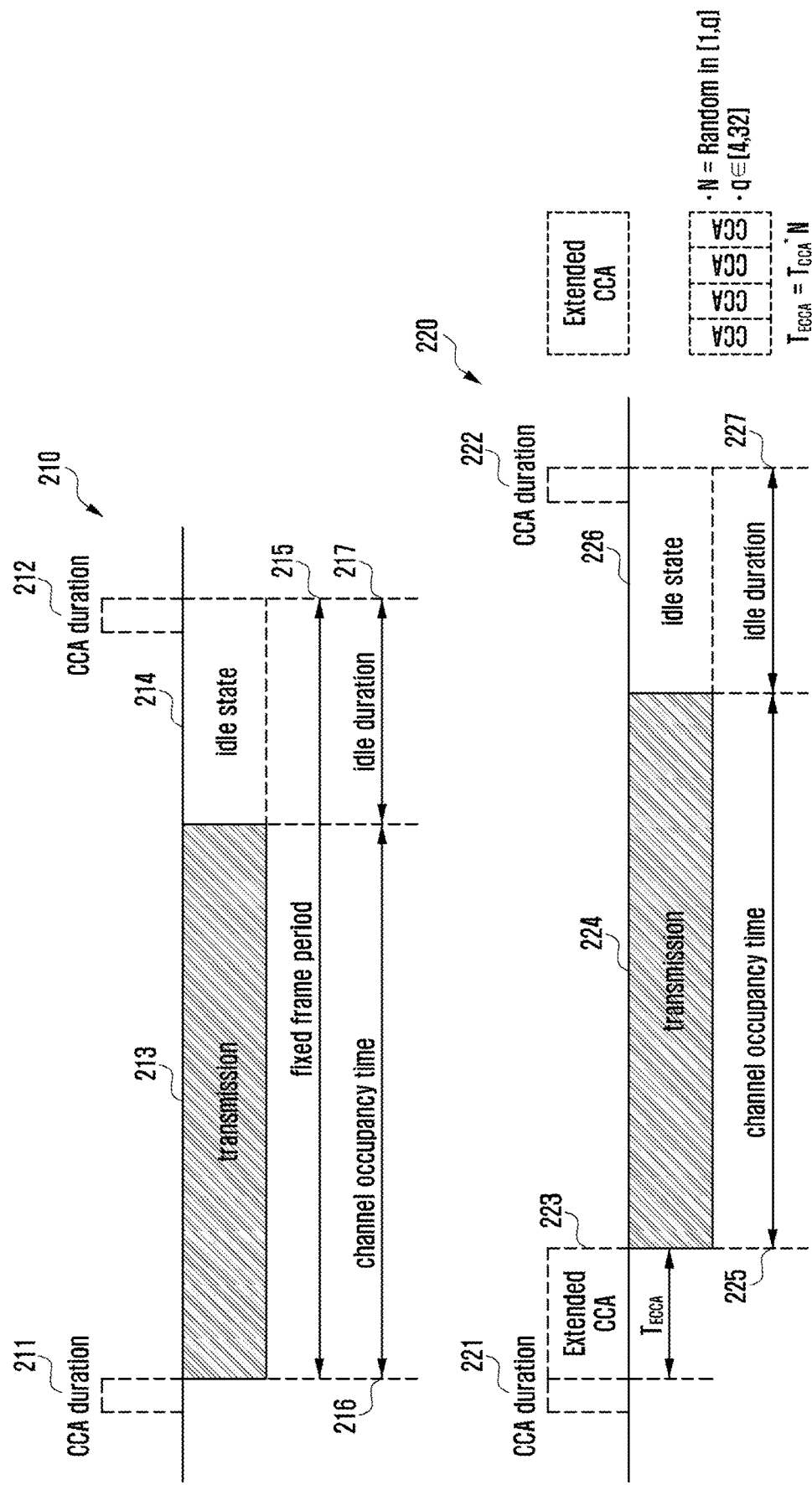
FIG. 2 is a diagram illustrating a Frame Based Equipment (FBE) operation and a Load Based Equipment (LBE) operation of an base station according to an embodiment of the present invention.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Detailed descriptions of technical specifications well-known in the art and unrelated directly to the present invention may be omitted to avoid obscuring the subject matter of the present invention. This aims to omit unnecessary description so as to make the subject matter of the present invention clear.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowchart s and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), that performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 is a diagram illustrating the TDD configurations specified in LTE.

In a TDD communication system, the downlink and uplink share the same frequency such that downlink and uplink transmissions alternate in the time domain. In LTE TDD, the downlink and uplink signals are discriminated by subframe. The numbers of downlink and uplink subframes may be determined to be equal to each other or different from each other such that the number of downlink subframes is greater than that of the uplink subframes or vice versa, depending on downlink and uplink traffic loads. In LTE, a radio frame consists of 10 subframes, and each subframe spans 1 ms.

In reference to FIG. 1, D denotes a downlink subframe, U denotes an uplink subframe, and S denotes a special subframe with the three fields: Downlink Pilot Time Slot (DwPTS), Guard Period (GP), and Uplink Pilot Time Slot (UpPTS). The DwPTS can be used for downlink control information transmission like an ordinary downlink subframe or, if its length is long enough according to the configuration of the special subframe, for downlink data transmission. The GP is the interval required for downlink-to-uplink switch, and its length is determined according to the network configuration. The UpPTS can be used for transmitting a terminal's Sounding Reference Signal (SRS) for uplink channel state estimation and a terminal's Random Access Channel (RACH).

For example, in case of TDD configuration #6, it may be possible to transmit downlink data and control information at subframes #0, #5, and #9 and uplink data and control information at subframes #2, #3, #4, #7, and #8. The subframes #1 and #6 designated as special subframes can be used for control information transmission or, depending on the case, data transmission in downlink and SRS or RACH transmission.

Applying the TDD configurations to an LAA system may cause problems as follows.

First, in the TDD configurations with a 5 ms switch periodicity, the downlink subframes are not consecutive in a TDD frame. If the downlink subframes are consecutive in the TDD frame, the base station may use the consecutive downlink subframes continuously after success in Clear Channel Assessment (CCA) or extended CCA (ECCA). However, if the downlink subframes are not consecutive in the TDD frame, the base station has to perform CCA or ECCA before every downlink (DL) transmission. This is likely to be a cause of increasing channel occupancy failure of the base station in the LAA system.

Second, in the TDD configurations with a 5 ms switch periodicity, two special subframes exist. This may cause a problem in that Wi-Fi preoccupies the channel when the base station or terminal does not transit any signal in the special subframes.

Third, the TDD configurations supported in the LTE system operating in the licensed bands are configured per 10 ms. In the LAA system operating in an unlicensed band and occupying the channel for as long a time as for the data to transmit, it is not necessary to configure the TDD configurations in consideration of the fixed LTE frame size.

For this reason, the present invention proposes a method for determining a TDD frame structure and TDD configurations for use in an LAA system.

FIG. 2 is a diagram illustrating a Frame Based Equipment (FBE) operation and a Load Based Equipment (LBE) operation of an base station according to an embodiment of the present invention.

In reference to FIG. 2, the timing diagram 210 shows a situation where an base station or a terminal operating in the FBE mode transmits data in an unlicensed band. The base station or terminal in the FBE mode may perform CCA during a CCA duration 211. The base station in the FBE mode may perform CCA over a predetermined time duration (e.g., 20 μs) before starting data transmission.

The CCA is an operation in which the transmitter measures an interference amount to determine whether another device currently uses the unlicensed band. If it is determined that the interference amount is less than a threshold value, the transmitter may perform transmission in the unlicensed band as denoted by reference number 213. Here, the time duration in which the transmitter performs transmission is referred to as channel occupancy duration 216.

The base station or terminal in the FBE mode may occupy the unlicensed band for at least 1 ms and up to 10 ms after performing the CCA once and then has to stay in the idle state 214 during a time period of at least 5% of the channel occupancy duration 216. This time period is referred to as idle duration 217.

Otherwise, if it is determined that the interference amount is equal to or greater than the threshold value, the transmitter may determine that the unlicensed band is currently occupied by another device. In this case, the transmitter may skip transmission and perform CCA during the next CCA duration 212.

However, in the case that, as a result of CCA, it is determined that the unlicensed band is occupied by another device, the transmitter cannot perform CCA during a predetermined time period, resulting in resource waste.

The timing diagram 220 shows a situation where an base station or terminal in the LBE mode transmits data in an unlicensed band. Like the base station or terminal in the FBE mode, the base station or terminal in the LBE mode has to perform CCA during the CCA duration 221 with a length over at least 20 μs before starting data transmission.

If it is determined as a result of CCA that the unlicensed band is not in use by another device, the transmitter may perform transmission as denoted by reference number 224. Otherwise if it is determined that the unlicensed band is in use by another device, the base station or terminal in the LBE mode may perform additional CCA. This additional CCA is referred to as extended CCA (ECCA) 223. The ECCA consists of N CCAs, and N is a random number selected in the range of [1, q] where q is a given number.

If it is determined as a result of ECCA that the unlicensed band is not in use by another device, the transmitter may perform transmission as denoted by reference number 224. Here, the time duration in which the base station or terminal in the LBE mode performs data transmission is referred to as channel occupancy duration 225. The channel occupancy duration 225 lasts for up to (13/32*q) ms and is followed by an idle duration 227 during which the transmitter stays in the idle state 226 without data transmission.

In the present invention, the base station may operate in the LBE mode for downlink transmission, and the terminal may operate in one of the FBE and LBE modes for uplink transmission.

Figure 3A:
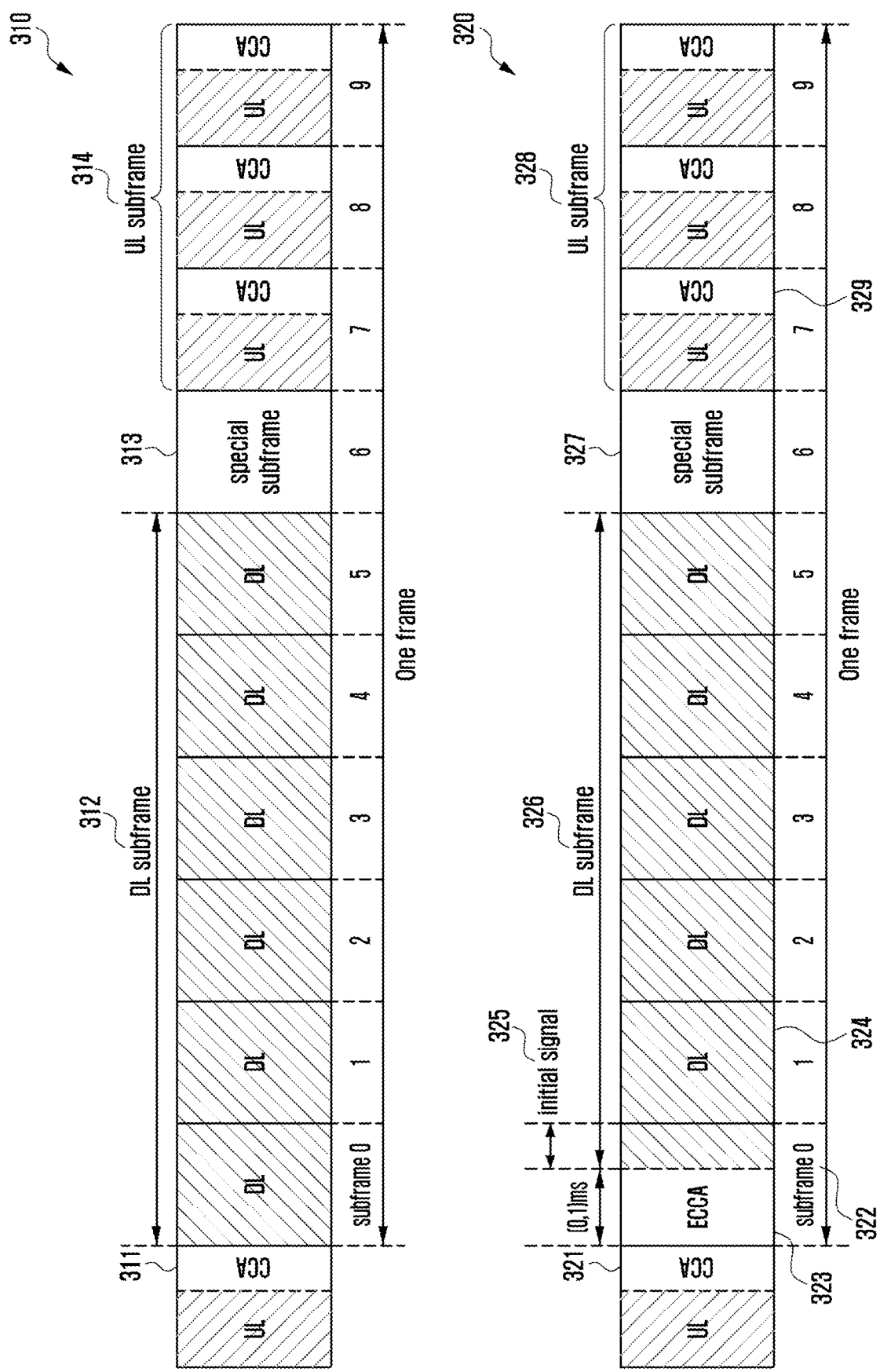
FIG. 3A is a diagram illustrating configurations of a TDD frame according to an embodiment of the present invention.

FIG. 3A is a diagram illustrating configurations of a TDD frame according to an embodiment of the present invention.

In reference to FIG. 3A, the base station may detect an idle channel during the first CCA duration 311 in the TTD frame 310. In this embodiment, the TDD frame 310 includes consecutive downlink subframes 312 in which the base station may perform downlink transmission. That is, all downlink subframes are arranged consecutively in the TDD frame 310. Here, the number of subframes for use in downlink transmission may vary depending on the amount of data to transmit. The base station may determine configuration on the subframes including the consecutive downlink subframe in a predetermined time period according to the data amount to transmit and send the configuration information to the terminal.

The drawing depicts the TDD frame 310 with 6 downlink subframes designated for downlink data transmission. In this case, the base station may transmit the subframes configuration information to the terminal. Also, the base station may transmit downlink data for 6 ms because the duration of one subframe is 1 ms.

The TDD frame 310 may include a special subframe 313 following the consecutive downlink subframes 312 and consecutive uplink subframes 314 following the special subframe 313.

The special subframe may include an idle duration defined in the regulation. The other part of the special subframe may be used by the base station or terminal for data or control signal transmission.

In the TDD frame 310, the subframe carrying an initial signal may be assigned subframe index 0. It may also be possible to assign subframe index 0 to the subframe carrying the first data following the initial signal. However, the subframe index determination is not limited thereto.

In the drawing, the TDD frame 320 has a frame structure for use in case where no idle channel is detected in the first CCA duration 321.

If no idle channel is detected as a result of CCA in the first CCA duration 321 of the TDD frame 320, the base station may perform eCCA 323 in the next subframe, i.e., subframe 0 322. Here, the time duration for performing the eCCA may be referred to as eCCA duration. The eCCA duration may also be called channel occupancy check duration.

If it is determined that the channel is in the idle state as a result of eCCA 323 in subframe 0 322, the base station may transmit downlink signals during the consecutive downlink subframes 326 starting from the next subframe, i.e., subframe 1 324.

However, the channel may be in use by another channel during the duration 325 between the time point of detecting the idle state of the channel and the time point of beginning the next subframe. For this duration, the base station may transmit the initial signal to occupy the channel.

The TDD frame 320 may also include a special subframe 327 following the consecutive downlink subframes 326 and uplink subframes 328 following the special subframe 327.

In uplink, the terminal performing uplink transmission may be changed every uplink subframe. The terminal may receive the information on uplink subframes for receiving downlink data. The terminal performs CCA or eCCA, to check whether the channel is preoccupied, for uplink transmission at the allocated subframes. If it is determined as a result of CCA or eCCA that the channel is in the idle state, the terminal may transmit uplink data in the corresponding subframes. Otherwise, if it is determined that the channel is in an occupied state, the terminal may not transmit uplink data in the corresponding subframes. The channel occupancy time of the terminal for uplink data transmission may be 1 ms, equal to the length of one subframe, or a multiple of 1 ms.

The terminal may perform CCA during the CCA duration 329 included in an uplink subframe, and the CCA duration 329 may consist of the last one or n symbols of the uplink subframe. Accordingly, there may be no signal transmission between the terminal and the base station during the last 1 or n symbols of the uplink subframe.

In the case of the terminal allocated the first uplink subframe 329, i.e., subframe 7, of the TDD frame 320, the CCA or eCCA may be performed in the downlink subframe or the special subframe right before the first uplink subframe 329.

However, the position and length of the duration for CCA or eCCA may be changed in the uplink subframes. A detailed description thereof is made with reference to FIG. 3B.

Figure 3B:
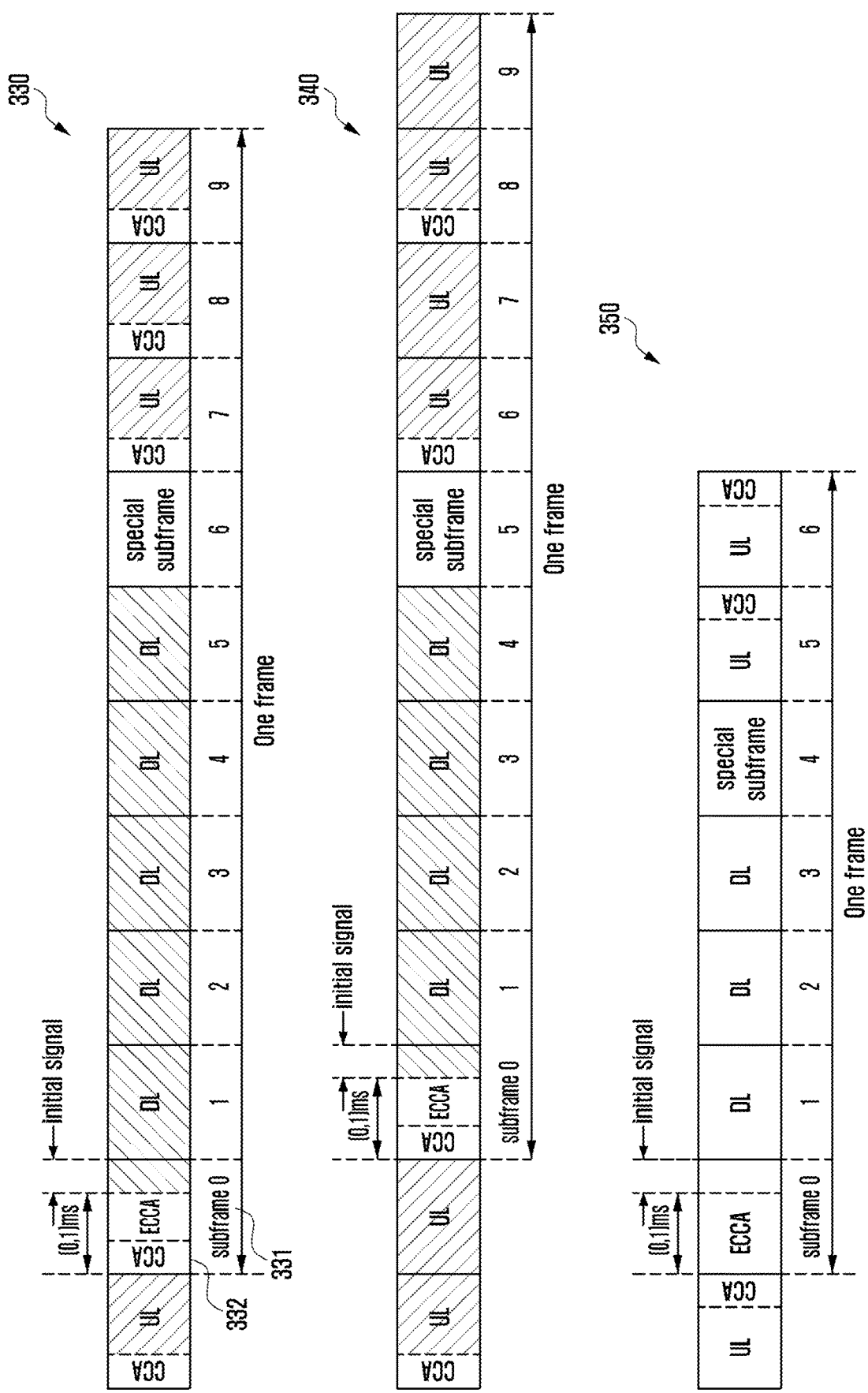
FIG. 3B is a diagram illustrating configurations of a TDD frame according to another embodiment of the present invention.

FIG. 3B is a diagram illustrating configurations of a TDD frame according to another embodiment of the present invention.

In reference to FIG. 3B, the TDD frames 330 and 340 are characterized in that the CCA duration is changed in position and sized in the uplink subframes.

In the case of the TDD frames 310 and 320, the CCA duration consists of the last one or n symbols of the previous subframe. Meanwhile, the CCA duration of the TDD from 330 consists of the first 1 or n symbols of the subframe.

Accordingly, the base station may perform CCA during the CCA duration 332 designated at the beginning of downlink subframe 0 331 of the TDD frame 330 and, if it is determined as a result of CCA that the channel is not idle, then perform eCCA immediately.

The terminal may also perform CCA or eCCA during first 1 or n symbols of each uplink subframe for uplink transmission. Accordingly, there may be no signal transmission between the terminal and the base station during the first 1 or n symbols of the uplink subframe.

Meanwhile, the TDD configuration information related to the TDD frame structure such as a start time point and number of consecutive downlink subframes, a position of the special subframe, a start time and number of consecutive uplink subframes, and CCA and ECCA durations of downlink and uplink subframes may be changed according to the data amount to be transmitted by the base station and terminals.

The TDD frame 340 is different in that the number of consecutive downlink subframes, the number of consecutive uplink subframes, and the CCA durations are changed.

If the amount of data to transmit is small, the number of consecutive downlink subframes may be decreased in the TDD frame 340. The TDD frame 340 includes 5 consecutive downlink subframes while the TDD frame 330 includes 6 consecutive downlink subframes.

The number of CCA durations may also be changed. In the case that a terminal transmits uplink data through an unlicensed band channel based on CCA, it may use two or more uplink subframes for data transmission according to the data amount to transmit. In reference to TDD frame 340, the terminal may perform CCA at an interval of two subframes in uplink. However, the base station may allocates uplink subframes to the terminal dynamically in number according to the data amount to be transmitted by each terminal and thus the interval of subframes for CCA may be dynamically changed.

In the case of the LAA system, however, the base station occupies the channel for a time duration that is sufficient to transmit data as described above, and it is not necessary to consider the fixed LTE frame length of 10 ms in configuring the TDD frame.

The TDD frame 350 is characterized in that the number of subframes is dynamically changed according to the data amount to be transmitted. In the TDD frame 350, the number of consecutive downlink subframes and the number of consecutive uplink subframes may be changed and, as a consequence, the frame length may be changed.

In detail, the TDD frame 350 may include 3 consecutive downlink subframes and 2 consecutive uplink subframes that appear sequentially after eCCA. In this case, the frame length becomes 7 ms shorter than the LTE frame length of 10 ms.

As described above, the TDD frame structured according to the present invention may include consecutive downlink subframes, special subframes, and consecutive uplink subframes. The TDD frame proposed in the present invention may be configured such that all downlink subframes are arranged consecutively and all uplink subframes are arranged consecutively. The positions of the consecutive downlink subframes, the consecutive uplink subframes, and special subframes may be changed.

It may also be possible that the frame is configured to have only the consecutive downlink subframes or only the consecutive uplink subframes.

If the base station transmits the TDD frame configuration information to a terminal at the current subframe or a subframe before n subframes, the terminal may check the downlink/uplink subframe configurations at the current subframe or a subframe after m subframes. The terminal may receive a downlink control channel (PDCCH) at the downlink subframes for performing Radio Resource Management (RRM) measurement or CSI measurement based thereon. The terminal may also determine one of the RRM management result and CSI measurement result for a bundle of the consecutive subframes. The base station may configure uplink subframes to the terminal to receive a Physical Uplink Control Channel (PUCCH) or a Sounding Reference Signal (SRS) and perform measurement thereon.

In order to apply the TDD frame structure proposed in the present invention to an LAA system, the base station may transmit the TDD configuration information to notify the terminal of the TDD frame structure. The TDD configuration information may include at least one of the informations listed in Table 1.

Among the above information, the channel occupancy end time point, frame end time point, downlink duration end time point, and uplink duration end point may be notified to the terminal by transmitting the corresponding time points explicitly or using the special subframe structure specified in LTE. As described above, an LTE special subframe consists of a DwPTS, an UpPTS, and a GP, which are configured as shown in Table 2.

TABLE 2

| Configuration | 3GPP release | DwPTS (Ts) | UpPTS (Ts) | Number of slots/subframe | | |
|---|---|---|---|---|---|---|
| | | | | Dw | GP | Up |
| 0 | 8 | 6592 | 2192 | 3 | 10 | 1 |
| 1 | 8 | 19760 | 2192 | 9 | 4 | 1 |
| 2 | 8 | 21952 | 2192 | 10 | 3 | 1 |
| 3 | 8 | 24144 | 2192 | 11 | 2 | 1 |
| 4 | 8 | 26336 | 2192 | 12 | 1 | 1 |
| 5 | 8 | 6592 | 4384 | 3 | 9 | 2 |
| 6 | 8 | 19760 | 4384 | 9 | 3 | 2 |
| 7 | 8 | 21952 | 4384 | 10 | 2 | 2 |
| 8 | 8 | 24144 | 4384 | 11 | 1 | 2 |
| 9 | 11 | 13168 | 4384 | 6 | 6 | 2 |

The base station may notify the terminal of the end time information as follows.

If the base station notifies the terminal that the $n^{th}$ subframe is the last downlink subframe and has the special subframe configuration 0, the terminal assumes that the end time point of the third symbol of the $n^{th}$ subframe is the downlink end time point.

If the base station notifies the terminal that the $n^{th}$ subframe is the last downlink subframe and has the special subframe configuration 9, the terminal assumes that the end time point of the $6^{th}$ symbol of the $n^{th}$ subframe is the downlink end time point.

As described above, the information such as the start and end time points and number of consecutive downlink subframes, the position of the special subframe, the start and end time points and number of consecutive downlink subframes, and the CCA duration may be changed according to the data amount to be transmitted by the base station and terminal at every transmission. The TDD configuration information may be changed at every CCA of the base station or every subframe and, as a consequence, the base station may transmit the changed TDD configuration information to the terminal through PDCCH.

The base station may use at least one of the following methods for transmitting the TDD configuration information.

If the base station is performing CCA or eCCA for a secondary component carrier (SCell) operating in the unlicensed band, it may transmit to the terminal the TDD configuration information through a control channel of the

TABLE 1

Channel occupancy start time point, channel occupancy end time point, residual channel occupancy time, frame length, frame start time point, frame end time point, downlink duration length, downlink duration start time point, downlink duration end time point, residual downlink duration length, uplink duration length, uplink duration start time point, uplink duration end time point, residual uplink duration length, CCA or ECCA duration of base station in downlink duration, CCA or ECCA duration of terminal in uplink duration, position of special subframe, presence/absence of partial subframe as part of total channel occupancy duration, and whether each subframe is an ordinary 1 ms subframe or a partial subframe shorter than 1 ms, etc.

primary component carrier (PCell) operating in the licensed band. Here, the control channel may include the information on Physical Downlink Control Channel (PDCCH), System Information Block (SIB), Radio Resource Control (RRC) configuration, and RRC reconfiguration. For example, the base station may transmit to the terminal the information as shown in Table 3 using a new element of the Downlink Control Indicator (DCI) on PDCCH.

TABLE 3

Format 0 (example, other formats can be used for the same purpose)

| Field name | Length | Comment |
|---|---|---|
| Flag for format0/format1A differentiation | 1 | |
| Hopping flag | 1 | |
| N_ULhop | 1 (1.4 MHz) 1 (3 MHz) 1 (5 MHz) 2 (10 MHz) 2 (15 MHz) 2 (20 MHz) | Applicable only when Hopping flag is set |
| Resource block assignment | 5 (1.4 MHz) 7 (3 MHz) 7 (5 MHz) 11 (10 MHz) 12 (15 MHz) 13 (20 MHz) | |
| MCS and RV | 5 | |
| NDI (New Data Indicator) | 1 | |
| TPC for PUSCH | 2 | |
| Cyclic shift for DM RS | 3 | |
| UL index (TDD only) | 2 | This field is present only for TDD operation with uplink-downlink configuration 0 |
| Downlink Assignment Index (DAI) | 2 | Only for TDD Operation with uplink-downlink configurations 1-6 |
| CQI request (1 bit) | 1 | |
| LAA information (newly added element) | N bits | At least one of the elements listed in Table 1 can be transmitted from the base station to the terminal in this way. |

If the base station performs CCA or eCCA in the SCell operating in the unlicensed band to occupy the channel, it may transmit the TDD configuration information to the terminal using a control channel (e.g., PDCCH, SIB, RRC configuration, and RRC reconfiguration) of the SCell.

Also, if the base station performs CCA or eCCA in the SCell operating in the unlicensed band to occupy the channel, it may transmit the TDD configuration information using the initial signal.

The base station may transmit to the terminal the TDD configuration information through the PCell and, if necessary, through the SCell. The terminal may combine or overwrite the configuration information received through the SCell with or on the configuration information received through the PCell.

As an example of the method for combining the configuration information received through the PCell and the configuration information received through the SCell, the terminal may be configured with the channel occupancy start time point for the target carrier received along with the cross-carrier scheduling command through the downlink control channel of the PCell and then configured with the channel occupancy end time point received through the downlink control channel of the SCell in the course of the downlink operation for the SCell on the target carrier. The terminal may determine the downlink subframes of the SCell in consideration of both the channel occupancy start time point received through the PCell and the channel occupancy end time point received through the SCell.

As an example of the method for overwriting the configuration information received through the SCell on the configuration received through the PCell, the terminal may be configured with the channel occupancy start and end time points for the target carrier received along with the cross carrier scheduling command through the downlink control channel of the PCell and then configured with the channel occupancy end time point (or residual channel occupancy time) received through the downlink control channel of the SCell in the course of performing downlink operation for the SCell on the target carrier. The terminal may overwrite or correct the channel occupancy end time point received through the PCell with the channel occupancy end time point (or residual channel occupancy time) received through the SCell. The terminal may determine the downlink subframe of the SCell in consideration of both the channel occupancy start time point received from the PCell or the overwritten or corrected channel occupancy end time point.

Figure 4:
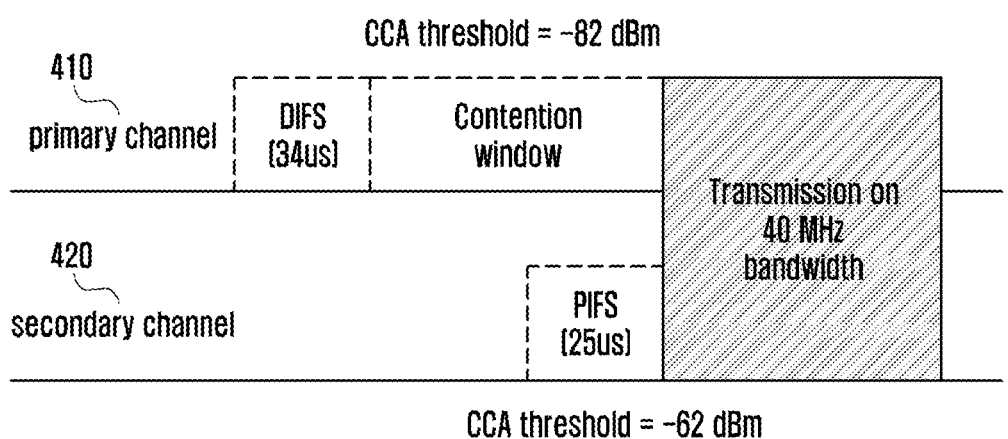
FIG. 4 is a diagram illustrating a method for performing CCA on different types of channel according to an embodiment of the present invention.

FIG. 4 is a diagram illustrating a method for performing CCA on different types of channel according to an embodiment of the present invention.

In order to use an unlicensed band, the base station has to determine whether the unlicensed band is in use by another device in the LAA system. Various parameters can be used for determining whether an unlicensed band channel is occupied by another device (or for performing CCA) and these parameters may be referred to as channel occupancy parameters. The channel occupancy parameters may include at least one of a CCA start time, a CCA duration, a CCA threshold, an idle period, an ECCA duration, and a channel occupancy time.

Meanwhile, a Wi-Fi device operating in an unlicensed band such as an LAA unlicensed band also has to perform CCA and, in the case of Wi-Fi, different channel occupancy parameters are used for different types of traffic. For example, IEEE 802.11e defines Enhanced Distributed Channel Access (EDCA) as a channel occupancy parameter (hereinafter, interchangeable referred to as CCA parameter, or Listen Before Talk (LBT) parameter) as shown in Table 4.

TABLE 4

| | Minimum contention window size (CWmin) | Maximum contention window size (CWmax) | Max TXOP |
|---|---|---|---|
| Background | 15 | 1023 | |
| Best effort | 15 | 1023 | 3.008 ms |
| Video | 7 | 15 | 1.504 ms |
| Voice | 3 | 7 | |
| Legacy | 15 | 1023 | |

In reference to FIG. 4, the primary channel 410 and the secondary channel 420 are discriminated by function. The channels discriminated by function may mean the channels transmitting different types of traffic or packets. As described above, since the Wi-Fi system uses traffic-specific channel occupancy parameters, different LBT parameters may be used for different types of channel in a multi-channel operation.

For example, an Access Point (AP) or a Station (STA) may perform eCCA during a DIFS period or a random back-off period on the primary channel 410. Meanwhile, the AP or STA may perform CCA during a PIFS on the secondary channel 420 to determine whether it is possible to occupy the channel.

Since the Wi-Fi system uses the same LBT parameter on different physical channels, the AP or STA have no preference for any specific channel. Accordingly, the AP or STA may observe the average channel occupancy time per channel to select the channel with the least average channel occupancy time.

By selecting a channel in this way, the types of traffic may be randomized on the respective channel; however, in the case that the channel allocation to the terminal is performed in a centralized manner as with being performed by an base station of an LTE system, it may be possible to improve the channel management efficiency and a detailed description thereof is made hereinafter.

Figure 5:
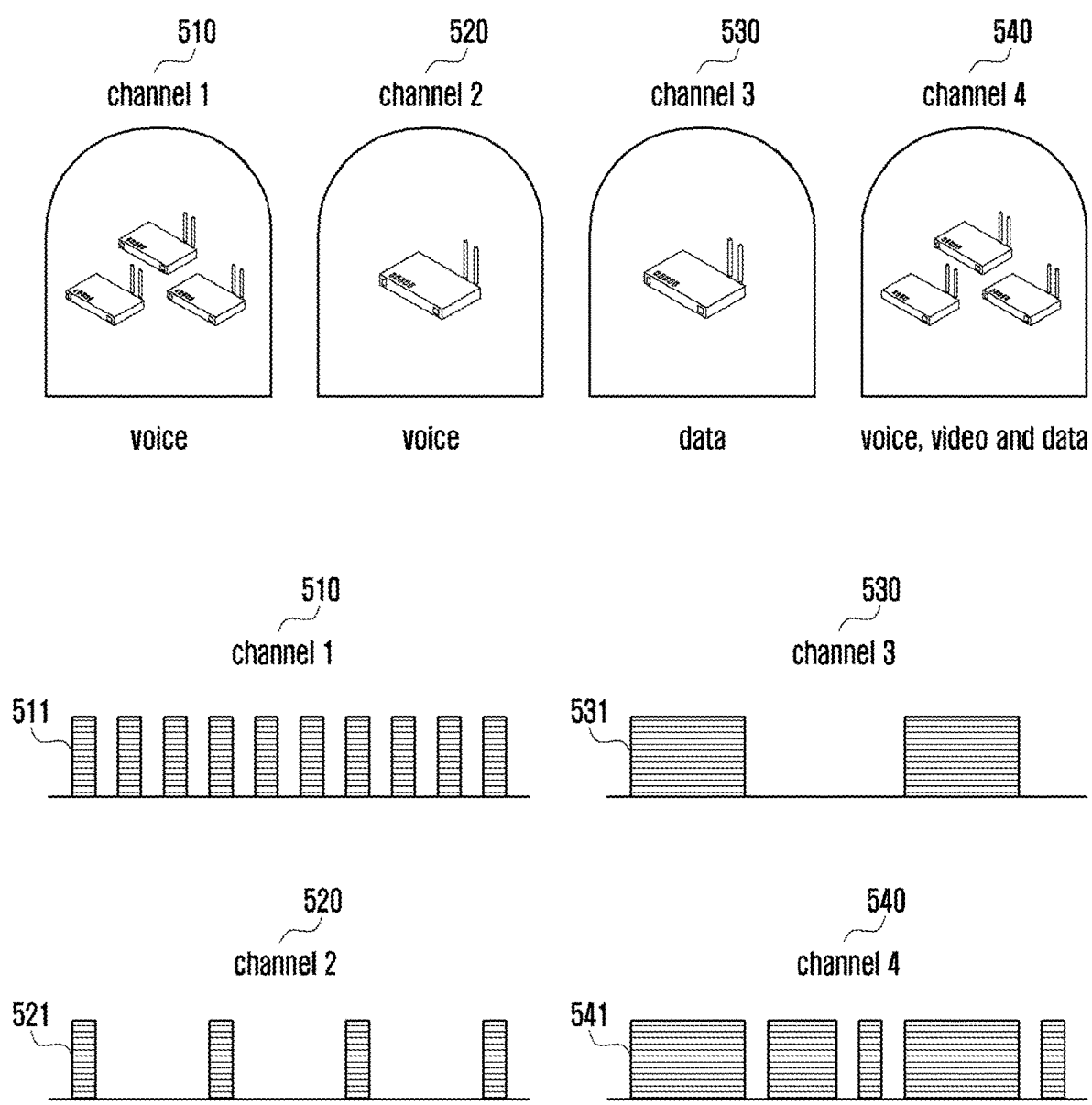
FIG. 5 is a diagram illustrating a situation where different types of traffic are carried on different channels in an unlicensed band to which an embodiment of the present invention is applicable.

FIG. 5 is a diagram illustrating a situation where different types of traffic are carried on different channels in an unlicensed band to which an embodiment of the present invention is applicable.

FIG. 5 exemplifies a situation where channel 1 510 and channel 2 520 carry voice packets, channel 3 530 carries data packets, and channel 4 540 carries voice, data, and video packets.

The voice packets 511 and 521 transmitted on the channel 1 510 and channel 2 520 may be relatively small in size in comparison with the data packet or video packet. The voice packet occurrence interval may be changed according to the number of APs, and the voice packets may be transmitted at a relatively short interval in comparison with the data or video packet.

Meanwhile, the data packet 531 transmitted on channel 3 530 and the data and video packets 541 and 542 transmitted on channel 4 540 may be relatively large in size in comparison with the voice packet. The data and video packets may be transmitted at a relatively long interval in comparison with the voice packet.

Figure 6A:
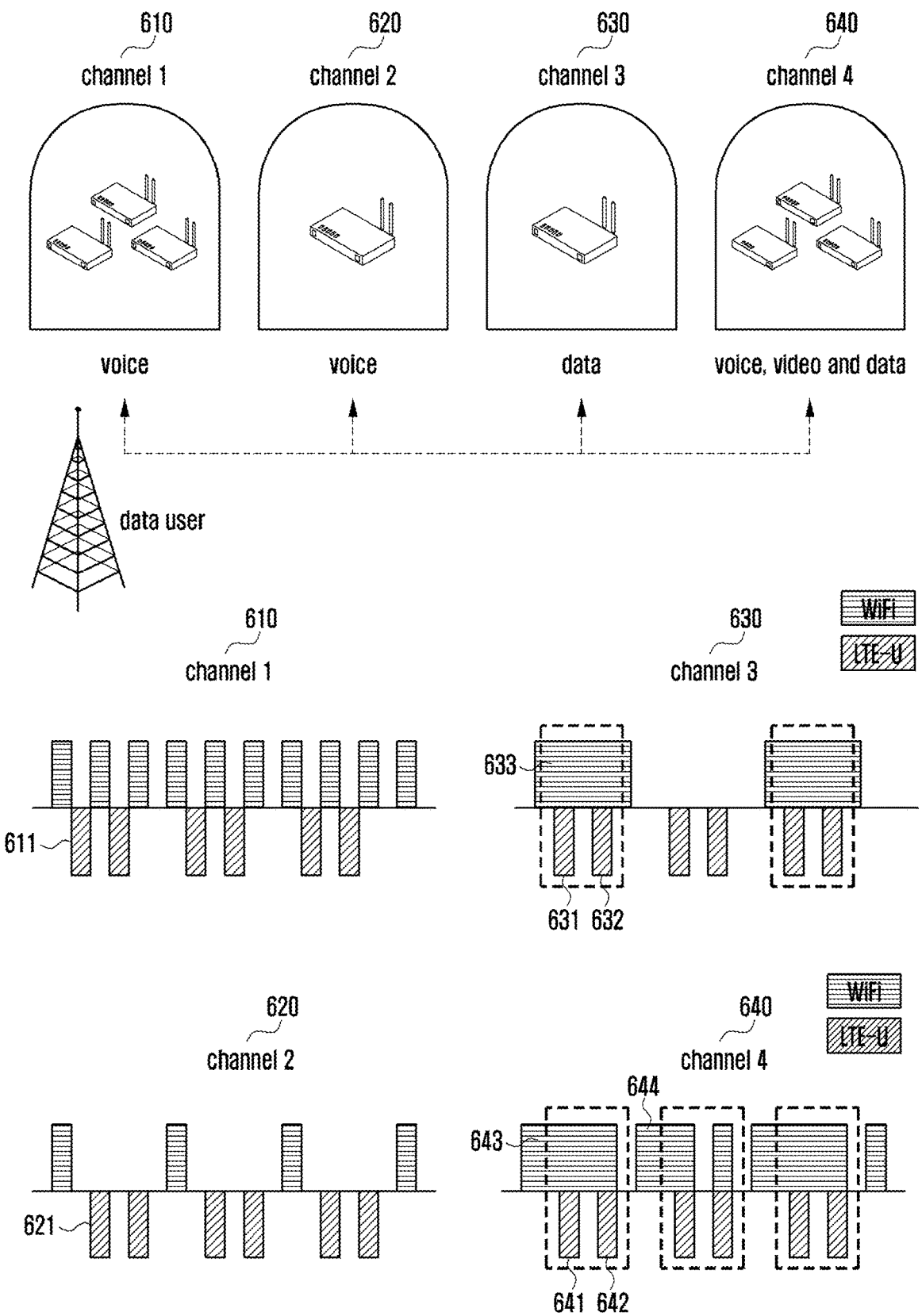
FIG. 6A is a diagram illustrating a situation of transmitting LAA voice packets in an unlicensed band to which an embodiment of the present invention is applicable.

FIG. 6A is a diagram illustrating a situation of transmitting LAA voice packets in an unlicensed band to which an embodiment of the present invention is applicable.

Similar to the situation of FIG. 5, in the situation of FIG. 6A, channel 1 610 and channel 2 620 carry Wi-Fi voice packets, channel 3 630 carries Wi-Fi data packets, and channel 4 640 carries Wi-Fi video, data, and voice packets.

In the case of attempting LAA voice packet transmission on channel 1 610 and channel 2 620 carrying the Wi-Fi voice packets, the base station can transmit the LAA voice packets 611 and 621 in the time durations with no Wi-Fi voice packet although the channel load is high.

Meanwhile, in the case of attempting LAA voice packet transmission on channel 3 630 and channel 4 640 carrying data packets, the voice packets transmitted by the base station and the Wi-Fi data packets are likely to collide in spite of low channel load because the Wi-Fi data packet is large in size. For example, the LAA voice packets 631 and 632 transmitted on channel 3 630 may collide with the data packet 633. Also, the LAA voice packets 641 and 642 transmitted on channel 4 640 may collide with the data packet 643 and the video packet 644.

Such collision between the Wi-Fi and LAA packets may decrease the data throughputs of both the Wi-Fi and LAA systems.

Figure 6B:
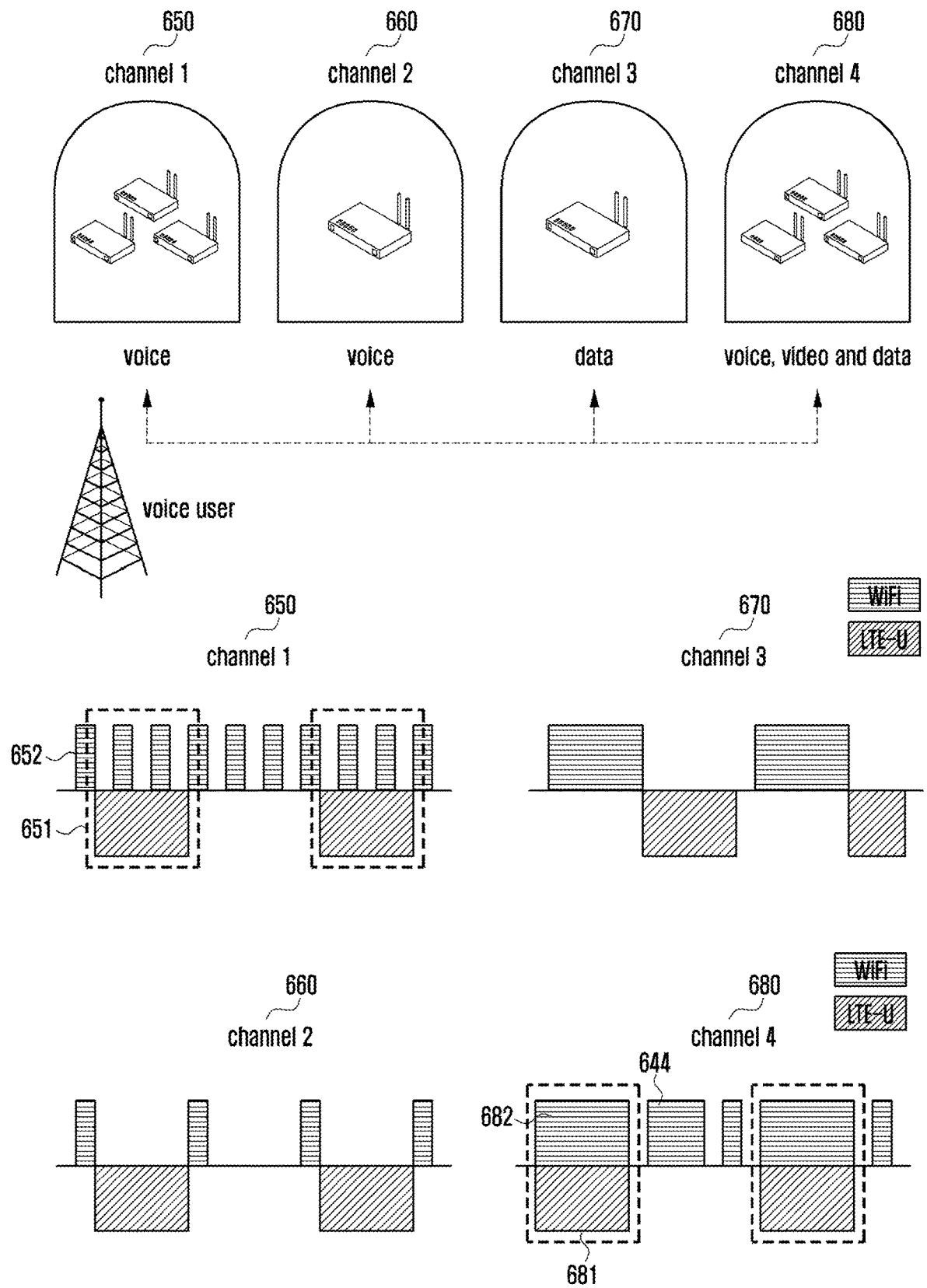
FIG. 6B is a diagram illustrating a situation of transmitting LAA data packets in an unlicensed band to which an embodiment of the present invention is applicable.

FIG. 6B is a diagram illustrating a situation of transmitting LAA data packets in an unlicensed band to which an embodiment of the present invention is applicable.

Channel 1 650 and channel 2 660 carry Wi-Fi voice packets, channel 3 670 carries Wi-Fi data packets, and channel 4 680 carries Wi-Fi video, data, and voice packets in a Wi-Fi network.

It is assumed that an LAA base station transmits data packets on channel 1 650 and channel 2 660 carrying the Wi-Fi voice packets. In this case, the LAA data packets are likely to collide with the Wi-Fi voice packets if the voice packets are transmitted frequently at a short interval in spite of low channel load. For example, the LAA data packet 651 transmitted on channel 1 650 may collide with the Wi-Fi voice packets 652.

Also, the LAA data packet 681 transmitted on channel 4 680 may collide with the Wi-Fi data packet 682.

However, if the Wi-Fi data packets are transmitted at a long interval, the LAA base station may transmit the LAA data packet in the time durations with no Wi-Fi data packets as shown in the case where the LAA base station transmits the data packets on channel 3 670 carrying the Wi-Fi data packets.

If the channel occupancy time is short and if the types of traffic carried on the channel are similar, it may be possible to use the channel more efficiently. For this reason, the present invention proposes a method for an LAA base station or terminal to check the channel occupancy behaviors of the devices operating on the channels and use LBT parameters suitable for the respective channels.

Figure 7A:
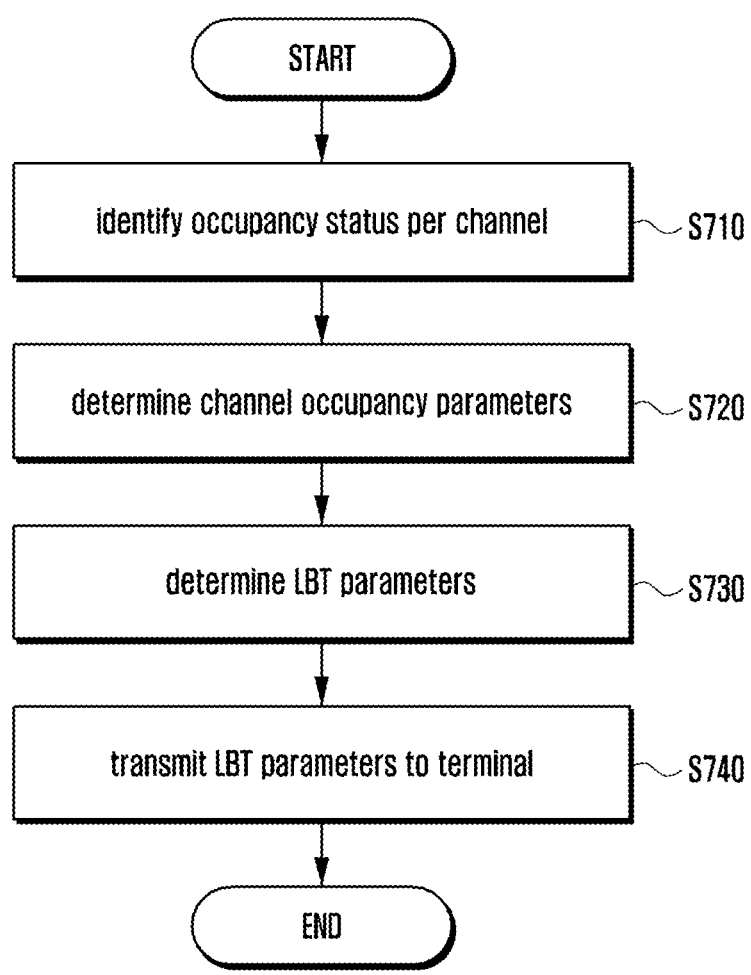
FIG. 7A is a flowchart illustrating an LBT parameter determination procedure according to an embodiment of the present invention.

FIG. 7A is a flowchart illustrating a LBT parameter determination procedure according to an embodiment of the present invention.

In reference to FIG. 7A, the base station may check channel occupancy status per channel at step S710. The base station may scan channels available in an unlicensed band during a predetermined period and observe the channel occupancy status.

Next, the base station determines channel state information for determining LBT parameters at step S720 based on the channel occupancy status.

The channel state information may include at least one of the parameters listed in Table 5.

TABLE 5

Average channel occupancy time of other devices, number of transitions from channel occupancy state (hereinafter, term "busy state" is interchangeably used) to channel non-occupancy state(term "idle state" is interchangeably used), number of transitions from idle state to busy state, average time of channel occupancy durations, total time of channel occupancy durations, average time of idle durations, total time of idle durations, standard deviation of occupancy durations, and standard deviation of idle durations The channel state information is described in detail with reference to FIG. 8.

Figure 8:
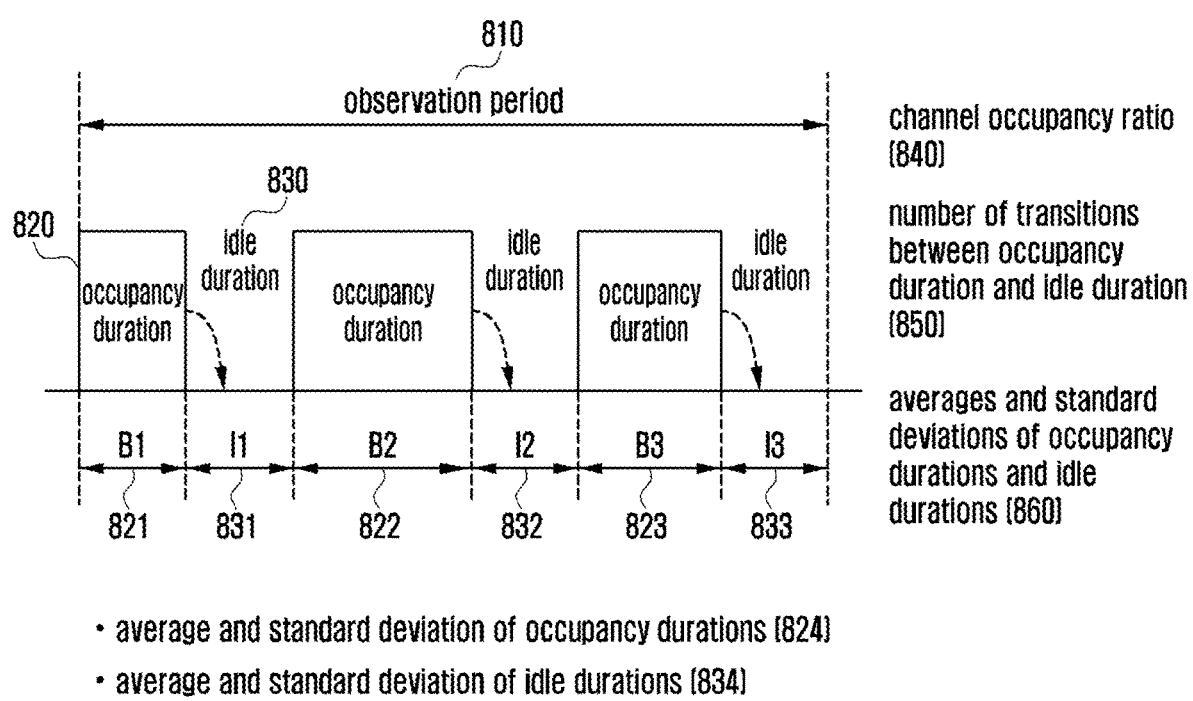
FIG. 8 is a diagram for explaining channel state information checked by an base station based on channel occupancy status according to an embodiment of the present invention.

FIG. 8 is a diagram for explaining channel state information checked by an base station based on channel occupancy status according to an embodiment of the present invention.

In reference to FIG. 8, a time duration for the base station to check the channel state of the unlicensed band may be referred to as observation period 810. The base station may perform observation during the observation period 810 to determine whether the unlicensed band is occupied and generate channel state information based on the determination result.

The base station may check occupancy durations (hereinafter, interchangeably referred to as busy durations) and non-occupancy durations (interchangeably referred to as "idle durations").

The base station may measure received signal strength during a predetermined period and, if the received signal strength is greater than a predetermined value, may determine the corresponding duration as the occupancy duration. Otherwise, if the received signal strength is equal to or less than the predetermine value, the base station may determine the corresponding duration as the idle duration.

In FIG. 8, the base station may check three occupancy durations 820 and three idle durations 830 in the unlicensed band. The base station may also check the occupancy durations of B1 821, B2 822, and B3 823. The base station may calculate the average occupancy time of the occupancy durations and the standard deviation 824 of the occupancy durations B1, B2, and B3.

The base station may also check the idle durations of I1 831, I2 832, and I3 833. The base station may calculate the average time of the idle durations I1, I2, and I3 and standard deviation 834 of the average value.

The base station may also determine a channel occupancy ratio 840 using the length of the observation period, the total occupancy time of the occupancy durations, and the total idle time of the idle durations.

The base station may also determine the number of transitions 850 between the occupancy duration and the idle duration during the observation period 810. The base station may determine the number of transmissions 850 based on the number of occupancy durations and the number of idle durations during the observation period 810.

The base station may determine LBT parameters based on the number of transitions between the occupancy duration and the idle duration. A detailed description thereof is made later.

The base station may also determine a number of idle slots.

The term "slot" means a time unit for use in determining an idle state or an occupancy time. For example, one slot may have the length of 9 us. The base station may make a decision on idle state or occupancy state by slot and determine numbers of idle slots and occupancy slots.

For example, the base station may determine the number of idle slots by dividing the total length of the idle time by the length of one slot. The base station may also determine the ratio of the idle slots by dividing the total length of the idle time by the length of the observation period. The base station may also determine the radio between the number of idle slots and the number of occupancy slots (busy slots) in the observation period. For example, the base station may determine the ratio between the idle slots and the occupancy slots (busy slots) by dividing the total length of the idle time by the total length of the occupancy time.

The base station may determine the LBT parameters based on at least one of the number of idle slots, the ratio of the idle slots, and the ratio between the idle slots and the occupancy slots.

Although the description is directed to the case where the base station checks the channel state and determines the channel state information for convenience of explanation, the present invention is not limited thereto. That is, the terminal may check the channel state and determine the channel state information, and the base station may determine LBT parameters based on the channel state information determined by the terminal.

Returning to FIG. 7A, after determining the channel state information, the base station may determine LBT parameters per channel based on channel-related parameters at step S730. In the case that the terminal checks the channel state, the base station may receive the channel state information from the terminal and determines the LBT parameters based on the received channel state information.

The LBT parameters may include at least one of the parameters listed in Table 6.

TABLE 6

CCA start time, CCA duration, CCA threshold, channel occupancy time, idle duration, ECCA duration Here, the ECCA duration may be referred to as a channel occupancy check duration. The ECCA duration may be determined by a contention window size of the LAA system, and the base station may calculate the contention window size based on the number of transitions from the occupancy state to the idle state, the number of idle slots, or the ratio between the number of idle slots and the number of occupancy slots, as part of the channel state information to determine the ECCA duration. The LBT parameters may be determined using various method and algorithms, and detailed descriptions thereof are made later.

Next, the base station may transmit the per-channel LBT parameters to the terminal at step S740.

The base station may transmit the LBT parameters to the terminal through a PCell operating in the licensed band. In detail, the base station may transmit the LBT parameters using a PDCCH, an SIB, an RRC connection configuration message, or an RRC connection reconfiguration message of the PCell operating on the licensed band.

Figure 7B:
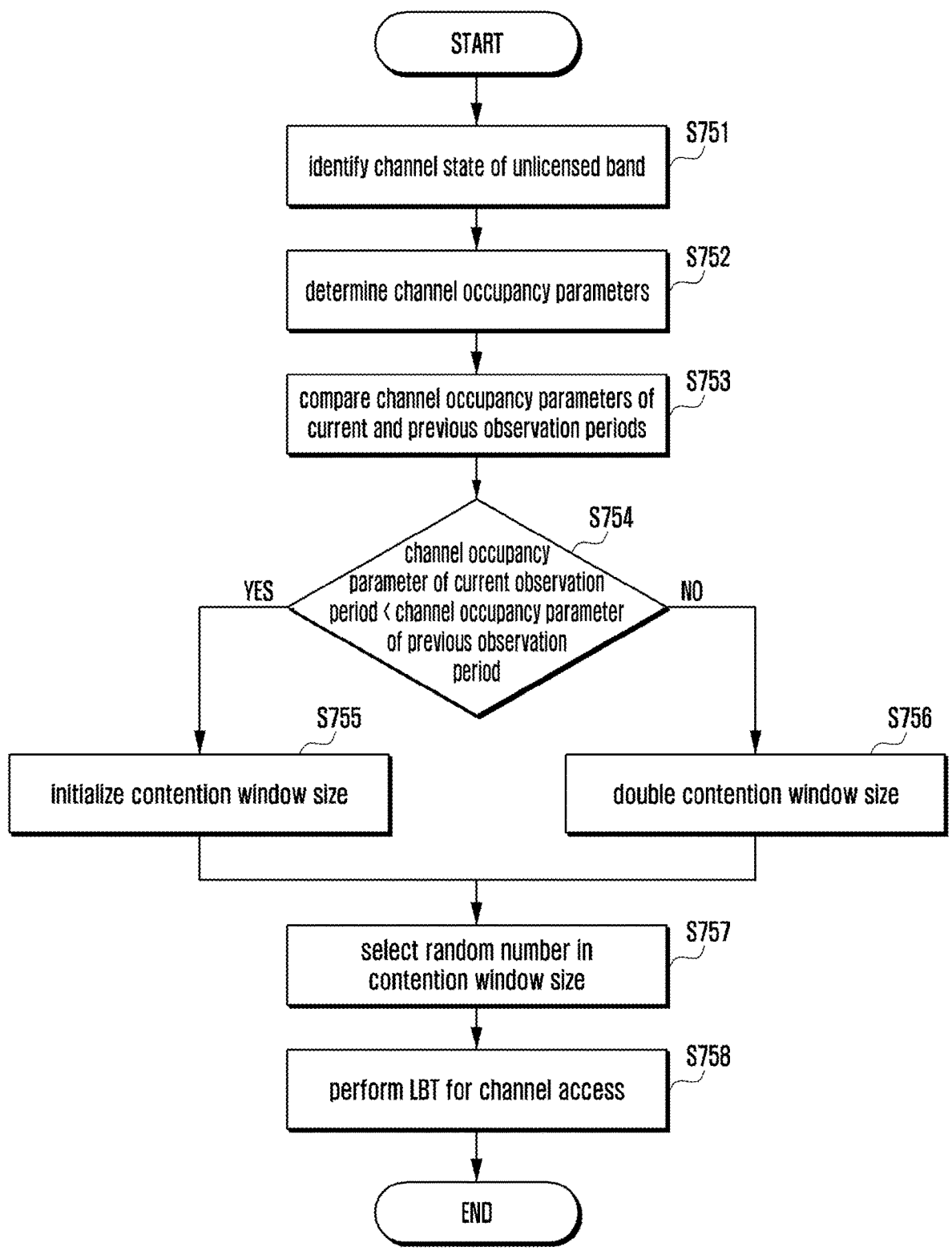
FIG. 7B is a flowchart illustrating a procedure for determining LBT parameters based on a channel state according to an embodiment of the present invention.

FIG. 7B is a flowchart illustrating a procedure for determining LBT parameters based on a channel state according to an embodiment of the present invention.

In reference to FIG. 7B, the base station may check the channel state of the unlicensed band during an observation period at step S751 and determine channel state information at step S752. Since these steps are similar to steps S710 and S720 of FIG. 7A, detailed descriptions thereof are omitted herein.

Next, the base station may perform a channel state information comparison at step S753. The base station may compare the channel state information determined during the current observation period and the channel state information determined during the previous observation period.

The base station may select at least one of the number of transitions from the occupancy duration to the idle duration, the average occupancy time of the occupancy durations, and the total occupancy time of the occupancy durations included in the channel state information for use in the comparison. The base station may compare the parameters of the current observation period and the previous observation period.

As a comparison result, if the channel state information of the current observation period is less than the channel state information of the previous observation period, the base station may initialize the contention window size to the least value at step S755.

Otherwise, if the channel state information of the current observation period is equal to or greater than the channel state information of the previous observation period, the base station may double the contention window size at step S756.

That is, if it is determined that the channel state information increases based on the comparison between two successive observation periods, this may indicate an increase in the number of users. In this situation, the base station may double the contention window size to avoid collision of packets transmitted on the same channel. Otherwise, if the parameter value of the channel state information decreases, the base station may initialize the contention window size.

Next, the base station may select a random number in the determined contention window size at step S757. Next, the base station may perform channel occupancy assessment (LBT) for access to the unlicensed band based on the selected random number at step S758. In detail, if the base station succeeds in CCA as many times as the selected number, it can access the unlicensed band.

Figure 7C:
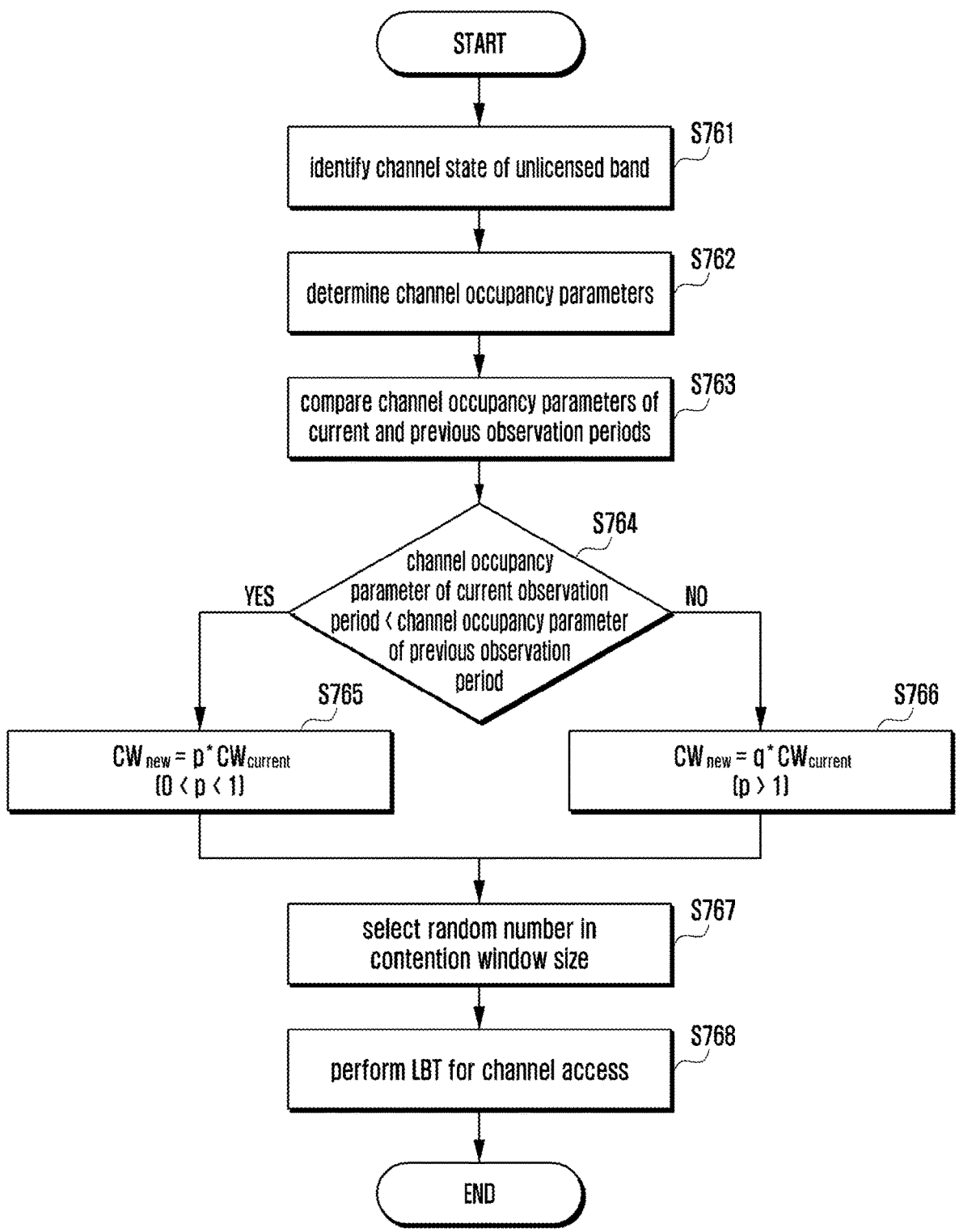
FIG. 7C is a flowchart illustrating a procedure for determining LBT parameters based on a channel state according to another embodiment of the present invention.

FIG. 7C is a flowchart illustrating a procedure for determining LBT parameters based on a channel state according to another embodiment of the present invention.

In reference to FIG. 7C, the base station at step S761 may check the channel state of the unlicensed band during an observation period and determine channel state information at step S762. Since these steps are similar to steps S710 and S720 of FIG. 7A, detailed descriptions thereof are omitted herein.

Next, the base station may perform a channel state information comparison at step S763. The base station may compare the channel state information determined during the current observation period and the channel state information determined during the previous observation period.

The base station may select at least one of the number of transitions from the occupancy duration to the idle duration, the average occupancy time of the occupancy durations, and the total occupancy time of the occupancy durations included in the channel state information for use in the comparison. The base station at step S764 may compare the parameters of the current observation period and the previous observation period.

As a comparison result, at step S764 if the channel state information of the current observation period is less than the channel state information of the previous observation period, the base station may determine a new contention window size by multiplying the contention window size by a predetermined first constant p at step S765. At this time, the first constant value p may be greater than 0 and less than 1.

Otherwise, if the channel state information of the current observation period is equal to or greater than the channel state information of the previous observation period, the base station may determine a new window size by multiplying the contention window size by a predetermined second constant value q at step S766. The second constant value q may be greater than 0 and less than 1.

Here, p and q may be determined according to a contention window size decrement/increment rate. Also, p and q may be set to values fulfilling the conditions of $0<p<1$ and $q>1$.

Next, the base station may select a random number in the determined contention window size at step S767. Next, the base station may perform channel occupancy assessment (LBT) for access to the unlicensed band based on the selected random number at step S768. In detail, if the base station succeeds in CCA as many times as the selected number, it can access the unlicensed band.

Figure 7D:
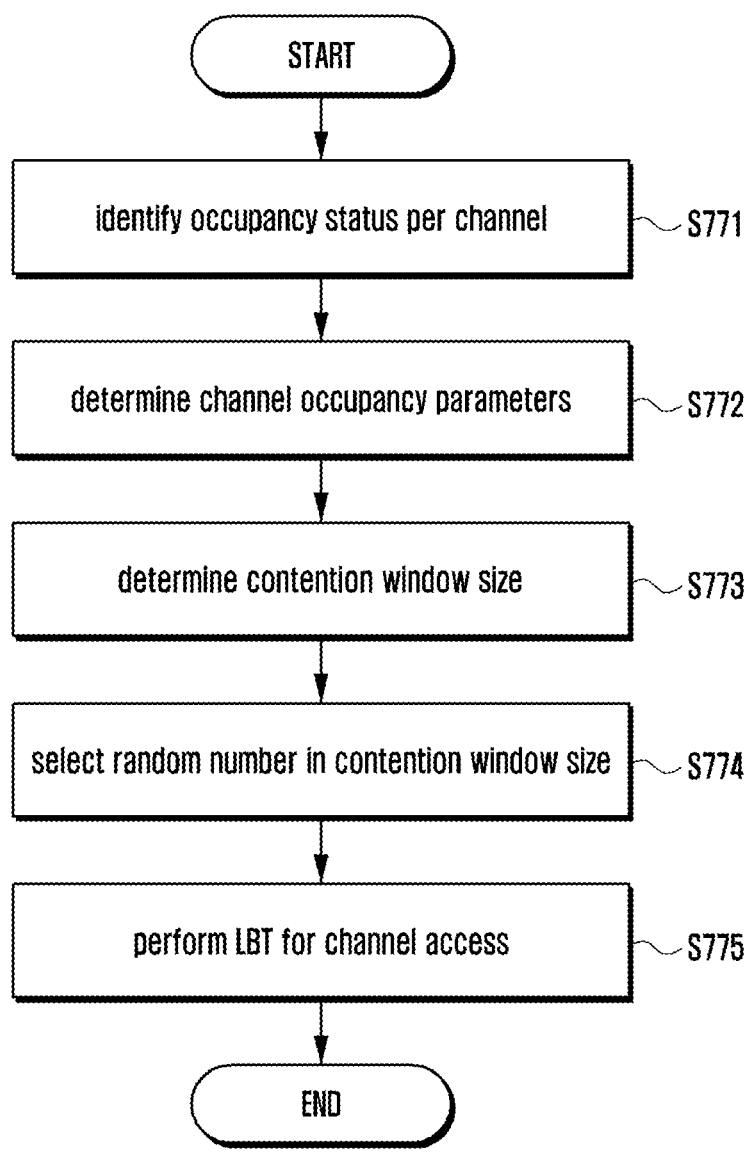
FIG. 7D is a flowchart illustrating a procedure for determining LBT parameters based on a channel state according to still another embodiment of the present invention.

FIG. 7D is a flowchart illustrating a procedure for determining LBT parameters based on a channel state according to still another embodiment of the present invention.

In reference to FIG. 7D, the base station may check the channel state of the unlicensed band during an observation period at step S771, and determine channel state information at step S772. Since these steps are similar to steps S710 and S720 of FIG. 7A, detailed descriptions thereof are omitted herein.

Next, the base station determines a contention window size based on a pre-stored mapping table and the channel state information at step S773. Table 7 is an example of the pre-stored mapping table.

TABLE 7

| channel state information (X) | Contention window |
|---|---|
| $X < N_0$ | 16 |
| $N0 <= X < N1$ | 32 |
| $N1 <= X < N2$ | 64 |
| $N2 <= X < N3$ | 128 |
| $N3 <= X < N4$ | 256 |
| $N4 <= X < N5$ | 512 |
| $N5 <= X$ | 1024 |

The base station may select at least one of the number of transitions from the occupancy duration to the idle duration, the average occupancy time of the occupancy durations, and the total occupancy time of the occupancy durations as the channel state information for use in determining the contention window size.

The base station may determine the contention window size using the channel state information of the current observation period and the mapping table.

Next, the base station may select a random number in the determined contention window size at step S774. Next, the base station may perform channel occupancy assessment (LBT) for access to the unlicensed band based on the selected number. In detail, if the base station succeeds in CCA as many times as the selected number step S775, it can access the unlicensed band.

Meanwhile, in an environment where the AP and STAs generate different types of traffic on a certain channel of the unlicensed band, the irregular channel occupancy pattern makes it difficult to determine the LBT parameters. For this reason, the present invention proposes a method for selecting a channel, the method being described hereinafter.

Figure 9:
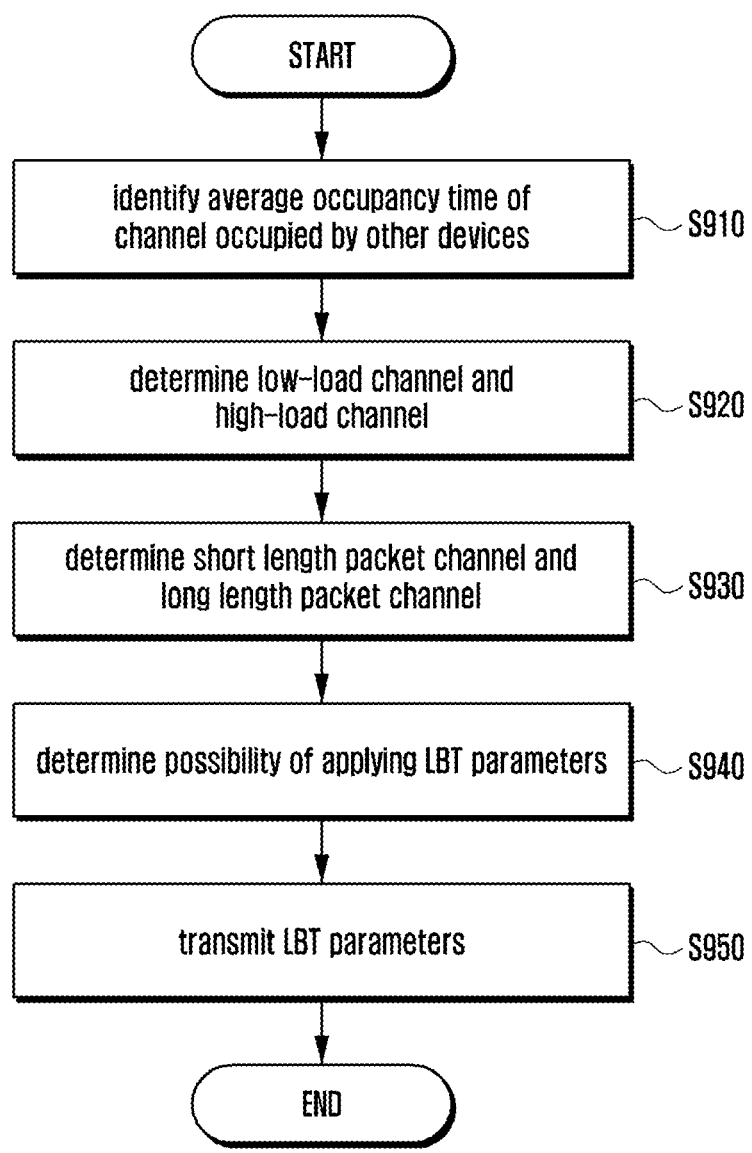
FIG. 9 is a flowchart illustrating a procedure for selecting a channel to which the LBT parameter determined based on channel states is applied according to an embodiment of the present invention.

FIG. 9 is a flowchart illustrating a procedure for selecting a channel to which the LBT parameter determined based on channel states is applied according to an embodiment of the present invention.

The base station may check the average occupancy time of a channel occupied by other devices at step S910. The average channel occupancy time of other devices may be determined based on the unlicensed band channel state checked by the base station or the terminal.

The base station may check whether the channel is a low-load channel or a high-load channel using the average channel occupancy time at step S920. If the average occupancy time is less than a predetermined value, the base station may determine the channel as a low-load channel.

Next, the base station may determine whether a channel is a short packet channel or a long packet channel at step S930. In detail, the base station may check the packet lengths on the respective channels based on the number of transitions from the occupancy duration to the idle duration, the number of transitions from the idle state to the occupancy state, the average time of occupancy durations, and average time of idle durations included in the channel state information.

For example, the base station may determine that the packet transmitted on a channel with a short average occupancy time is short in length. That is, the base station may determine the channel on which the average occupancy time value is less than a predetermined value as a short packet channel. It may also be possible to determine the channel on which the number of transitions from the occupancy state to the idle state is less than a predetermined value and the average occupancy time is shorter than a predetermined length as the short packet channel. The above packet length determination method is only an exemplary embodiment, and the present invention is not limited thereby.

Next, the base station may determine at step S940 whether it is possible to apply the LBT parameters determined based on the channel condition to the channel. That is, the base station may determine whether the information acquired at the previous step is valid. This is because an irregular channel occupancy pattern makes it difficult for the base station to determine and apply LBT parameters according to the channel condition. Here, the base station may use the standard deviations of the occupancy durations and idle durations.

If the standard deviation of the occupancy durations is large, this may mean that the information mismatch between the occupancy durations is large. If the standard deviation is large, this means that the acquired information is uneven; thus, the base station may determine that the information acquired based on the average of the occupancy durations is invalid. In this case, the base station may not use the LBT parameters determined based on the channel condition in association with the channel with large standard deviations of the occupancy durations and idle durations.

Meanwhile, the base station may determine that the information acquired on the channel with an occupancy or idle duration standard deviation less than a predetermined value is valid and thus that the LBT parameters are applicable.

If it is determined that the acquired information is valid, the base station may apply the determined LBT parameters at step S950. In detail, the base station may sort the channels into 4 groups and apply the LBT parameters to the respective channels.

Figure 10:
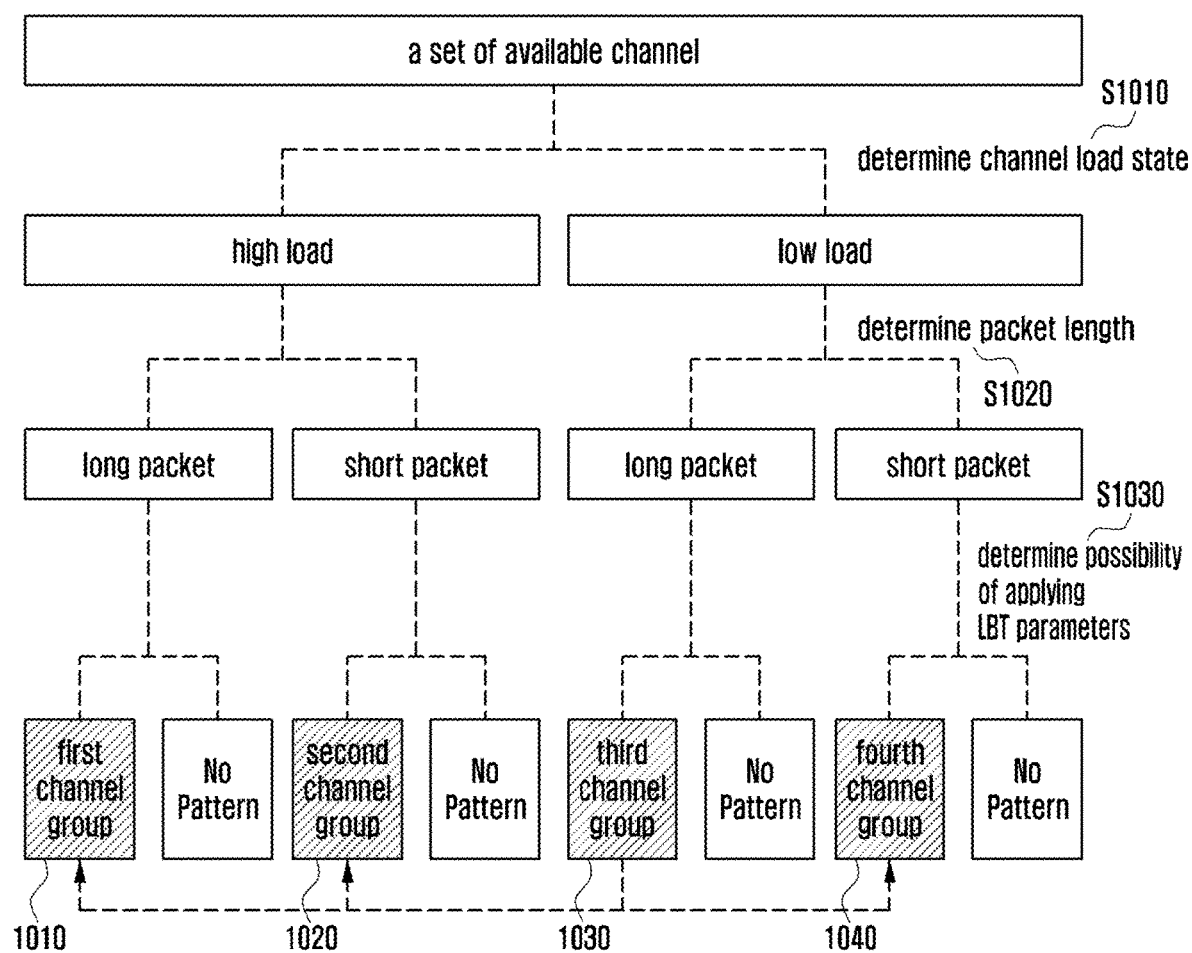
FIG. 10 is a diagram illustrating a procedure for sorting channels into four channel groups according to an embodiment of the present invention.

FIG. 10 is a diagram illustrating a procedure for sorting channels into four channel groups according to an embodiment of the present invention.

In reference to FIG. 10, the four channel groups include the first channel group 1010 characterized by large packet length and high load, the second channel group 1020 characterized by small packet length and high load, the third channel group 1030 characterized by large packet size and small load, and the fourth channel group 1040 characterized by large packet size and high load.

The base station may check occupancy states of available unlicensed band channels and determine load states of each of the channels based on the occupancy states at step S1010. For example, the base station may determine the load states of the channels using the average occupancy times and channel occupancy ratios of each of the channels. Here, the base station may compare the average occupancy times or channel occupancy ratios of the channels to sort the channels into a high-load channel category and a low-load channel category. That is, the base station may sort the channels with an average occupancy time or occupancy ratio greater than a predetermined value into a high-load channel.

Afterward, the base station may check packet lengths at step S1020. The base station may determine the packet length per channel based on the number of transitions between occupancy duration and idle duration and average times of occupancy durations and idle durations.

For example, the longer is the average time of the occupation durations, the longer is the packet length. Accordingly, if the average time of the occupancy durations is long, the base station determines that the packet length is long.

Next, the base station may determine at step S1030 whether the LBT parameters determined based on the channel condition are valid. The base station checks the validity of the information acquired on the channel using the standard deviations of the occupancy durations and idle durations. If the standard deviation is less than a predetermined value, the base station may validate the validity of the information acquired on the channel and determine and apply the LBT parameters. If it is determined that the information acquired on the channel is valid, the base station may sort the channel into one of the channel groups.

For example, base station may sort the channel with a high load and short packet length into the first channel group.

After sorting the channels, the base station may apply the LBT parameters according to the per-channel conditions.

Figure 11:
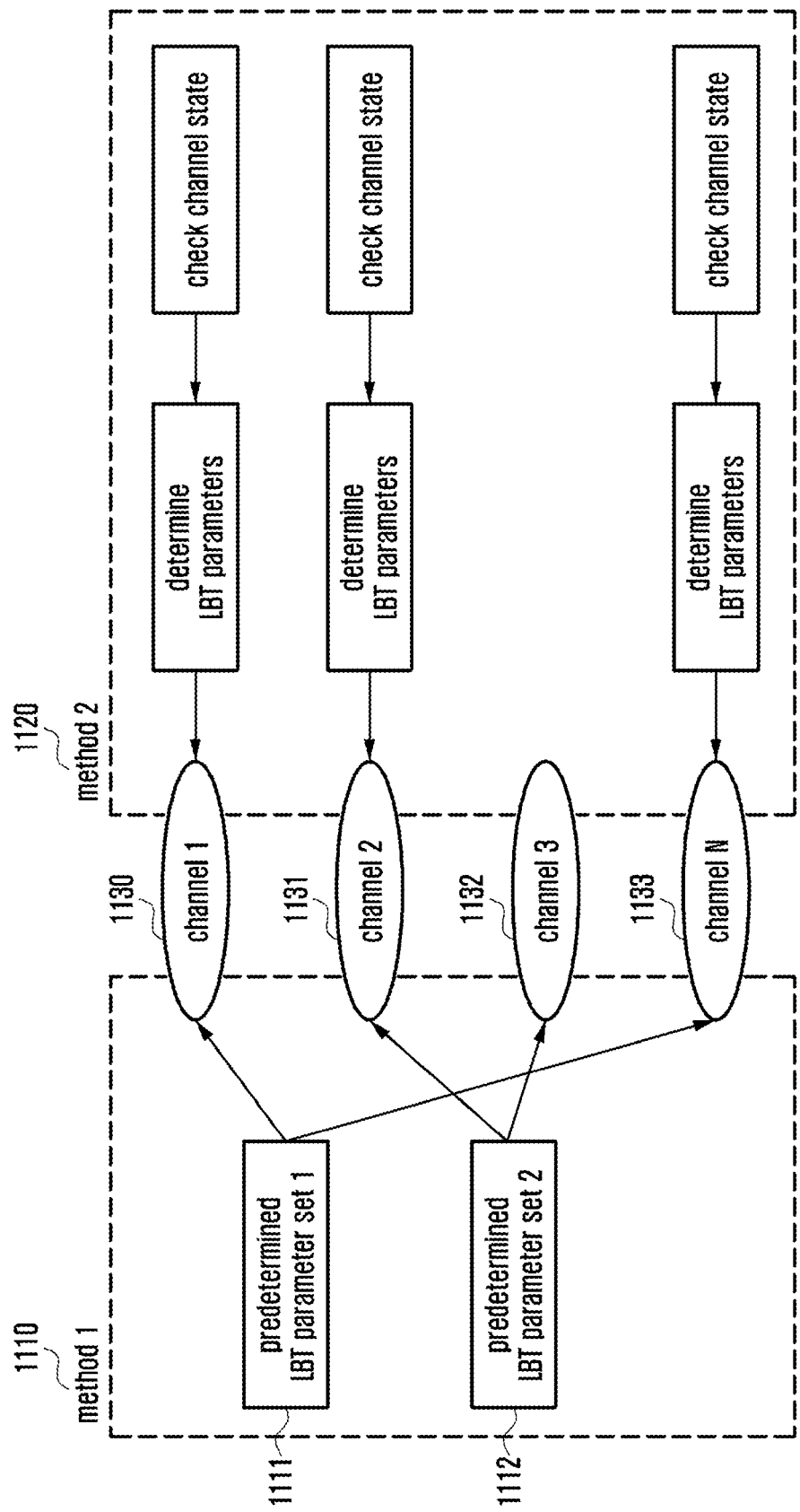
FIG. 11 is a diagram illustrating a method for determining LBT parameters per channel according to an embodiment of the present invention.

FIG. 11 is a diagram illustrating a method for determining LBT parameters per channel according to an embodiment of the present invention.

FIG. 11 shows two methods for determining LBT parameter per channel.

In the first method, the base station and the terminal store at least one predetermined LBT parameter set, and the base station transmits to the terminal an index of the LBT parameter set determined per channel.

In this case, each LBT parameter set may include at least one LBT parameter. For example, an LBT parameter set may include CCA duration, ECCA duration, and CCA start time. The base station and the terminal may store the index of the at least one parameter set, and the base station may send the terminal the index of the LBT parameter set currently in use.

In method 1 1110 of FIG. 11, a predetermined LBT parameter set 1 1111 and a predetermined LBT parameter set 2 1112 may be stored in the base station and the terminal. The base station may determine to use the LBT parameters included in the LBT parameter set 1 1111 for channel 1 1130 and channel N 1133 and then transmit the index of the LBT parameter set 1 to the terminals operating on channel 1 1130 and channel N 1133.

The base station may also determine to use the LBT parameters included in the LBT parameter set 2 1112 for channel 2 1131 and channel 3 1132 and, in this case, transmit the index of the LBT parameter set 2 to the terminals operating on the corresponding channels.

In the second method, the base station determines LBT parameters per channel and notifies the terminal of the parameters explicitly.

In method 2 1120 of FIG. 11 the base station may check channel state per channel, determine LBT parameters based on the channel state, and transmit the parameters to the terminal.

The steps of checking channel state and determining LBT parameters based on the channel states are identical with those of FIG. 7.

After determining the LBT parameters to be applied per channel, the base station may transmit the LBT parameters to the terminal using an SIB, a PDCCH, or an RRC configuration message. A detailed description thereof is made with reference to FIG. 12.

Figure 12:
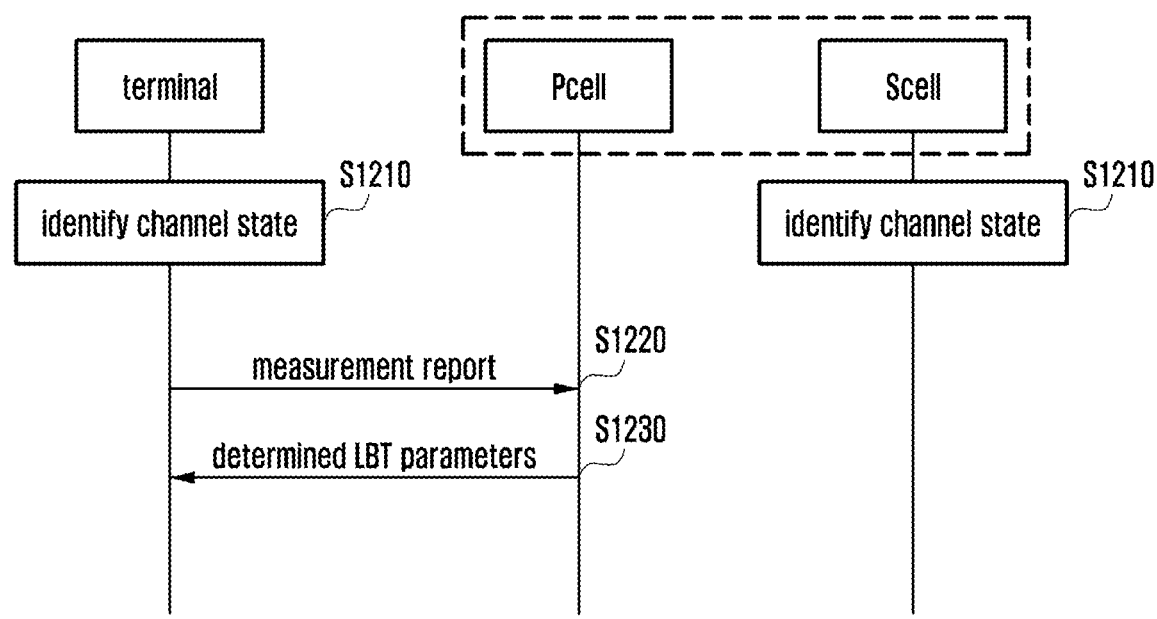
FIG. 12 is a signal flow diagram illustrating a procedure for transmitting LBT parameters to a terminal according to an embodiment of the present invention.

FIG. 12 is a signal flow diagram illustrating a procedure for transmitting LBT parameters to a terminal according to an embodiment of the present invention.

In reference to FIG. 12, an LAA base station may use a primary carrier (PCell) in a licensed band and a secondary carrier (SCell) in an unlicensed band. In this case, the base station may check the channel state of the unlicensed band at step S1210. Also, the terminal may check the channel state of the unlicensed band at step S1210. The channel state checking step of the terminal is optional.

In the case that the terminal checks the channel state, the base station may receive a channel state measurement report associated with the unlicensed band at step S1220. The measurement report may include channel state information.

If the measurement report is received from the terminal, the base station may determine LBT parameters based on the base station-measured channel state and the measurement report.

The base station may determine the LBT parameters based on the channel state measurement report received from the terminal and the occupancy parameters determined through its channel observation and analysis. For example, the base station may determine the ECCA duration by adjusting the contention window size based on the channel state.

After determining the LBT parameters, the base station may transmit the LBT parameters to the terminal at step S1230. In this case, the base station may transmit the LBT parameters using at least one of an SIB, a PDCCH, and an RRC configuration information.

The base station may also transmit an index of an LBT parameter set or LBT parameter information using at least one of the SIB, PDCCH, and RRC configuration information.

Figure 13:
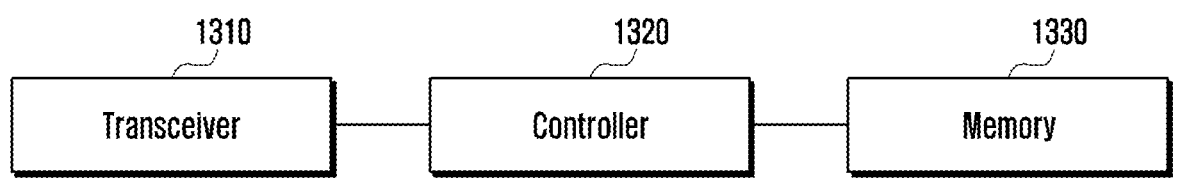
FIG. 13 is a block diagram illustrating a configuration of an base station according to an embodiment of the present invention.

FIG. 13 is a block diagram illustrating a configuration of an base station according to an embodiment of the present invention.

In reference to FIG. 13, the base station may include a transceiver 1310, a controller 1320, and a memory 1330.

The transceiver 1310 may communicate with a network entity.

According to an embodiment of the present invention, the transceiver 1310 may transmit TDD configuration information of a TDD frame to a terminal. The transceiver 1310 may also transmit downlink data to the terminal and receive uplink data from the terminal.

According to an embodiment of the present invention, the transceiver 1310 may receive a channel state measurement report from the terminal. The transceiver 1310 may also transmit to the terminal the LBT parameters determined based on the channel state.

According to an embodiment of the present invention, the controller 1320 may perform CCA during an initial CCA duration to determine whether an unlicensed band channel is occupied. If it is determined that the channel is occupied, the controller 1320 may perform eCCA during the next CCA duration. If it is determined as a result of CCA or eCCA that the unlicensed band channel is idle, the base station may occupy the unlicensed band channel to transmit downlink data. Here, a frame may be configured to have consecutive downlink subframes. In this case, the base station may transmit downlink data during the consecutive downlink subframes. Here, the number of downlink subframes may be changed.

The controller 1320 may also perform CCA or eCCA during the first one or n symbols of every subframe according to the configuration of the TDD frame. The controller 1320 may also perform CCA or eCCA during the last one or n symbols of every subframe.

The base station may generate TDD configuration information corresponding to the determined frame structure and transmit the TDD configuration information to the terminal.

If the base station performs CCA or eCCA on a secondary carrier (SCell) of the unlicensed band, the controller 1320 may transmit the TDD configuration information to the terminal using the control channel of the primary carrier (PCell). The control channel of the PCell may include the information on PDCCH, SIB, RRC configuration, and RRC reconfiguration.

If the base station occupies the channel through CCA and eCCA in the SCell operating in the unlicensed band, the controller 1320 may transmit the TDD configuration information using a control channel of the SCell such as PDCCH, SIB, RRC configuration, and RRC reconfiguration of the SCell.

If the base station occupies the channel through CCA or eCCA in the SCell operating in the unlicensed band, the controller 1320 may transmit the TDD configuration information to the terminal using an initial signal transmitted by the base station.

According to an embodiment of the present invention, the controller 1320 may check the channel state of the unlicensed band and determine channel state information based thereon. The controller 1320 may also determine LBT parameters based on the channel state information. In this case, if the channel state information value increases in comparison with the previous observation period, the controller 1320 may increase the contention window size and determine the LBT parameters. The controller 1320 may also perform a channel access procedure with the LBT parameters to access the unlicensed band channel. The controller 1320 may also transmit to the terminal at least one of an index of an LBT parameter set and RRC configuration information using at least one of an SIB, a PDCCH, and RRC configuration information.

Meanwhile, any irregular channel occupancy pattern makes it difficult to apply the LBT parameters determined based on the channel state. Accordingly, the controller 1320 may determine the load state of the channel based on the channel occupancy time and may determine per-channel packet length based on information such as the number of transitions from occupancy state to idle state, the number of transitions from idle state to occupancy state, the average time of occupancy durations, and average time of idle durations. Additionally, the controller 1320 may determine validity of acquired information based on the standard deviation of each occupancy duration, standard deviation of each idle duration and may determine whether to apply the LBT parameter.

According to an embodiment of the present invention, the memory 1330 may store the TDD configuration information related to the TDD frame structure. The memory 1330 may also store CCA parameters for performing CCA.

According to an embodiment of the present invention, the memory 1330 may store LBT parameter sets including LBT parameters and indices of the LBT parameter sets. The memory 1330 may also store the channel state information generated based on the channel state. The memory 1330 may also store the information related to the channel state received from the terminal.

Figure 14:
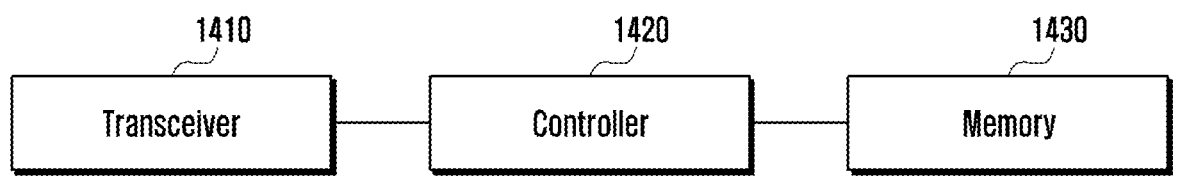
FIG. 14 is a block diagram illustrating a configuration of a terminal according to an embodiment of the present invention.

FIG. 14 is a block diagram illustrating a configuration of a terminal according to an embodiment of the present invention.

In reference to FIG. 14, the terminal may include a transceiver 1410, a controller 1420, and a memory 1430.

The transceiver 1410 may communicate with a network entity.

According to an embodiment of the present invention, the transceiver 1410 may receive TDD configuration information from an base station. The transceiver 1410 may receive downlink data from the base station and transmit uplink data to the base station.

According to an embodiment of the present invention, the transceiver 1410 may transmit a channel state measurement report to the base station. The controller 1410 may also receive LBT parameters from the base station.

According to an embodiment of the present invention, the controller 1420 may perform CCA during uplink subframes allocated by the base station to determine whether the unlicensed band channel is occupied. If it is determined that the channel is occupied, the terminal may not transmit uplink data. Otherwise it is determined that the channel is not occupied, the terminal may transmit uplink data to the base station.

The controller 1420 may perform CCA or eCCA during the first one or n symbols of the uplink subframe allocated by the base station according to the TDD frame structure. The controller 1420 may also perform CCA or eCCA during the last one or n symbols of the previous subframe.

If it is determined as a result of CCA performed by the base station that the unlicensed band channel is in the idle state, the controller 1420 may also control receiving data during consecutive downlink subframes.

The controller 1420 may also control receiving the TDD configuration information corresponding to the frame structure from the base station.

According to an embodiment of the present invention, the controller 1420 may check an unlicensed band channel state and determine channel state information based thereon. The controller 1420 may also control transmitting the channel state information to the base station. The channel state information may be used for determining the LBT parameters.

The controller 1420 may also control receiving LBT parameter information from the base station. The controller 1420 may also control receiving an index of an LBT parameter set or LBT parameter information through at least one of an SIB, a PDCCH, and RRC configuration information.

According to an embodiment of the present invention, the memory 1430 may store the TDD configuration information received from the base station. The memory 1430 may also store the CCA parameters for use in performing CCA.

According to an embodiment of the present invention, the memory 1430 may store LBT parameter sets including LBT parameters and indices of the LBT parameter sets.

The memory 1430 may also store the channel state information generated based on the channel state.

Although the description has been made with reference to particular embodiments, the present invention can be implemented with various modifications without departing from the scope of the present invention. Thus, the present invention is not limited to the particular embodiments disclosed and will include the following claims and their equivalents.

The invention claimed is:

1. A communication method performed by base station in a mobile communication system, the method comprising:
   identifying occupancy status for a channel of an unlicensed band;
   determining channel state information including a number of transitions from idle state to busy state based on the occupancy status;
   determining parameters that are used for determining whether the channel is busy, based on the number of transitions from idle state to busy state; and
   transmitting the parameters to a terminal.

2. The method of claim 1, wherein the determining of the parameters comprises:
   determining a contention window size based on a number of transitions from busy state to idle state, a number of idle slots, or a ratio of the idle slots to busy slots ; and
   determining a channel occupancy check duration based on the contention window size.

3. The method of claim 2,
   wherein the parameters include the channel occupancy check duration, and
   wherein the channel state information includes at least one of the number of transitions from busy state to idle state, the number of idle slots, or the ratio of the idle slots to busy slots.

4. The method of claim 1, wherein the parameters are included in at least one of a physical downlink control channel (PDCCH), a system information block (SIB), a radio resource control (RRC) configuration message, or an RRC reconfiguration message being transmitted to the terminal.

5. A base station of a mobile communication system, the base station comprising:
   a transceiver; and
   a controller configured to:
      identify occupancy status for a channel of an unlicensed band,
      determine channel state information including a number of transitions from idle state to busy state based on the occupancy status,
      determine parameters that are used for determining whether the channel is busy, based on the number of transitions from idle state to busy state, and
      control the transceiver to transmit the parameters to a terminal.

6. The base station of claim 5, wherein the controller is further configured to:
   determine a contention window size based on a number of transitions from busy state to idle state, a number of idle slots, or a ratio of the idle slots to busy, and
   determine a channel occupancy check duration based on the contention window size,
   wherein the parameters include the channel occupancy check duration.

7. The base station of claim 6,
   wherein the parameters include the channel occupancy check duration, and
   wherein the channel state information includes at least one of the number of transitions from busy state to idle state, the number of idle slots, or the ratio of the idle slots to busy slots.

8. The base station of claim 5, wherein the parameters are included in at least one of a physical downlink control channel (PDCCH), a system information block (SIB), a radio resource control (RRC) configuration message, or an RRC reconfiguration message being transmitted to the terminal.

9. A communication method performed by a terminal of a mobile communication system, the method comprising:
   identifying occupancy status for a channel of an unlicensed band;
   determining channel state information including a number of transitions from idle state to busy state based on the occupancy status;
   transmitting the channel state information to a base station; and
   receiving parameters that are used for determining whether the channel is busy,
   wherein the parameters are determined based on the number of transitions from idle state to busy state.

10. The method of claim 9,
    wherein the parameters include a channel occupancy check duration which is determined based on a contention window size, and
    wherein the contention window size is determined based on a number of transitions from an occupancy busy state to idle, a number of idle slots, or a ratio of the idle slots to busy slots.

11. The method of claim 10,
    wherein the parameters include the channel occupancy check duration, and
    wherein the channel state information includes at least one of the number of transitions from busy state to idle state, the number of idle slots, or the ratio of the idle slots to busy slots.

12. The method of claim 9, wherein the parameters are included in at least one of a physical downlink control channel (PDCCH), a system information block (SIB), a radio resource control (RRC) configuration message, or an RRC reconfiguration message.

13. A terminal of a mobile communication system, the terminal comprising:
    a transceiver; and
    a controller configured to:
        identify occupancy status for a channel of an unlicensed band,
        determine channel state information including a number of transitions from idle state to busy state based on the occupancy status,
        control the transceiver to transmit the channel state information to a base station, and
        control the transceiver to receive parameters that are used for determining whether the channel is busy,
        wherein the parameters are determined based on the number of transitions from idle state to busy state.

14. The terminal of claim 13,
    wherein the parameters include a channel occupancy check duration which is determined based on a contention window size, and
    wherein the contention window size is determined based on a number of transitions from busy state to idle state, a number of idle slots, or a ratio of the idle slots to busy slots.

15. The terminal of claim 14,
    wherein the parameters include the channel occupancy check duration, and
    wherein the channel state information includes at least one of the number of transitions from busy state to idle state, the number of idle slots, or the ratio of the idle slots to busy slots.

16. The terminal of claim 13, wherein the parameters are included in at least one of a physical downlink control channel (PDCCH), a system information block (SIB), a radio resource control (RRC) configuration message, or an RRC reconfiguration message.

* * * * *